US009774561B1

(12) United States Patent
Rapp et al.

(10) Patent No.: US 9,774,561 B1
(45) Date of Patent: Sep. 26, 2017

(54) CUSTOMIZED ELECTRONIC DOCUMENT DISTRIBUTION

(71) Applicant: Amazon Technologies, Inc., Reno, NV (US)

(72) Inventors: Monica Marie Rapp, Mercer Island, WA (US); Benjamin James Wyant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 14/203,221

(22) Filed: Mar. 10, 2014

(51) Int. Cl.
*G06F 15/16* (2006.01)
*H04L 12/58* (2006.01)

(52) U.S. Cl.
CPC .................................. *H04L 51/36* (2013.01)

(58) Field of Classification Search
CPC ...................................................... H04L 51/36
USPC .................................................. 709/206, 207
See application file for complete search history.

(56) References Cited

U.S. PATENT DOCUMENTS

| | | | | |
|---|---|---|---|---|
| 2007/0124376 A1* | 5/2007 | Greenwell | ........... | G06Q 10/107 709/204 |
| 2009/0028306 A1* | 1/2009 | Rhie | ................... | H04L 12/5835 379/93.01 |
| 2009/0144387 A1* | 6/2009 | Smith | ............... | G06F 17/30867 709/207 |
| 2009/0150507 A1* | 6/2009 | Davis | .................. | H04L 12/5855 709/207 |
| 2009/0319623 A1* | 12/2009 | Srinivasan | ........... | G06Q 10/107 709/206 |
| 2011/0228922 A1* | 9/2011 | Dhara | ................. | H04L 12/1818 379/202.01 |
| 2011/0282950 A1* | 11/2011 | Luzzatto | .............. | G06Q 10/107 709/206 |
| 2012/0078845 A1* | 3/2012 | Kasbekar | ............. | G06Q 10/107 707/640 |
| 2014/0059567 A1* | 2/2014 | Wilson | ...................... | G06F 8/38 719/318 |
| 2014/0366158 A1* | 12/2014 | Han | ........................ | G06F 21/60 726/28 |

\* cited by examiner

*Primary Examiner* — Joseph Greene
(74) *Attorney, Agent, or Firm* — Lee & Hayes, PLLC

(57) ABSTRACT

A distribution host may receive an electronic document from a sender device that includes content distribution designations. Based on the content distribution designations, the distribution host may determine that a portion of the electronic document is designated for distribution to multiple recipients. The distribution host may further determine that an additional portion of the electronic document is designated for distribution to a particular recipient of the multiple recipients. Accordingly, the distribution host may distribute the portion as a version of the electronic document to the recipient devices of one or more recipients that does not include the particular recipient. Further, the distribution host may distribute the portion and the additional portion as an additional version of the electronic document exclusively to a recipient device of the particular recipient.

20 Claims, 15 Drawing Sheets

CUSTOMIZED ELECTRONIC DOCUMENT DISTRIBUTION

BACKGROUND

Email is useful for both business and personal communications. In the current implementations of email communication systems, an email message is generally sent to one or more pre-determined recipients. Such an email message works well for a correspondence that is intended to be a communication between a sender and a single recipient, or when the email message deals with a single topic. In such instances, an email thread that results from the email message generally stays on topic and is easy to follow. However, when an email message is sent to multiple recipients or contain multiple topics in which not all of the subjects are relevant to every recipient, the email message may generate an email thread or multiple email threads that stray away from the original topic or topics. Further, such an email message may also create email paralysis in which at least some of the recipients may wait for another recipient to respond or take some other action before responding to the email.

Moreover, a sender of the email message to multiple recipients may wish to communicate privately with one of the multiple recipients on the same topic or topics without involving the remaining recipients. In such a scenario, the sender may have no choice but to send a separate email to the particular recipient regarding the same topic or topics, and also track the additional email thread that results from the separate email.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The disclosure is directed to architectures and techniques for customizing the distribution of electronic documents to multiple recipients. In various embodiments, the electronic documents may include emails, office productivity documents, and any other document in electronic form that can be edited by multiple users. An electronic document may be customized for distribution such that a group of recipients may receive a general portion of the electronic document, while a particular recipient of the group of recipients receives both the general portion and a private portion of the electronic document. In other instances, the electronic document may be customized for distribution so that upon receipt by multiple recipients, the electronic document is marked in different ways for different recipients. For example, the electronic document may be marked as informational for a first recipient, while marked as including a task for completion for a second recipient. In this way, the first recipient may not take any action on the electronic document, while the second recipient may be compelled to complete a task that is associated with the electronic document. In another example, the electronic document may be marked as having a higher priority value for a first recipient, while being marked as having a lower priority value for a second recipient. Accordingly, the first recipient may take action with respect to the electronic document prior to or instead of the second recipient.

In additional instances, rather than manually customizing each of multiple electronic documents for differential distribution to recipients, a sender may set a global rule for a distribution application, such that the distribution application may automatically customize the distribution of the electronic document to one or more recipients based on one or more characteristics of the electronic document. In still other instances, an application on a recipient device may categorize incoming electronic documents or tasks included in the incoming electronic documents based on the identities of the senders.

Thus, by customizing the distribution of the portions of an electronic document and assigning different action indications or priority indications to the electronic document for different recipients, the electronic documents may be processed in a more efficient manner by the recipients of the electronic documents. For example, in instances in which the electronic documents are emails, problems such as inadvertent generation of multiple email threads, being overwhelmed by irrelevant emails, as well as inaction due to unclear delegation of tasks described in the emails may be reduced or prevented.

Illustrative System Architecture

Figure 1:
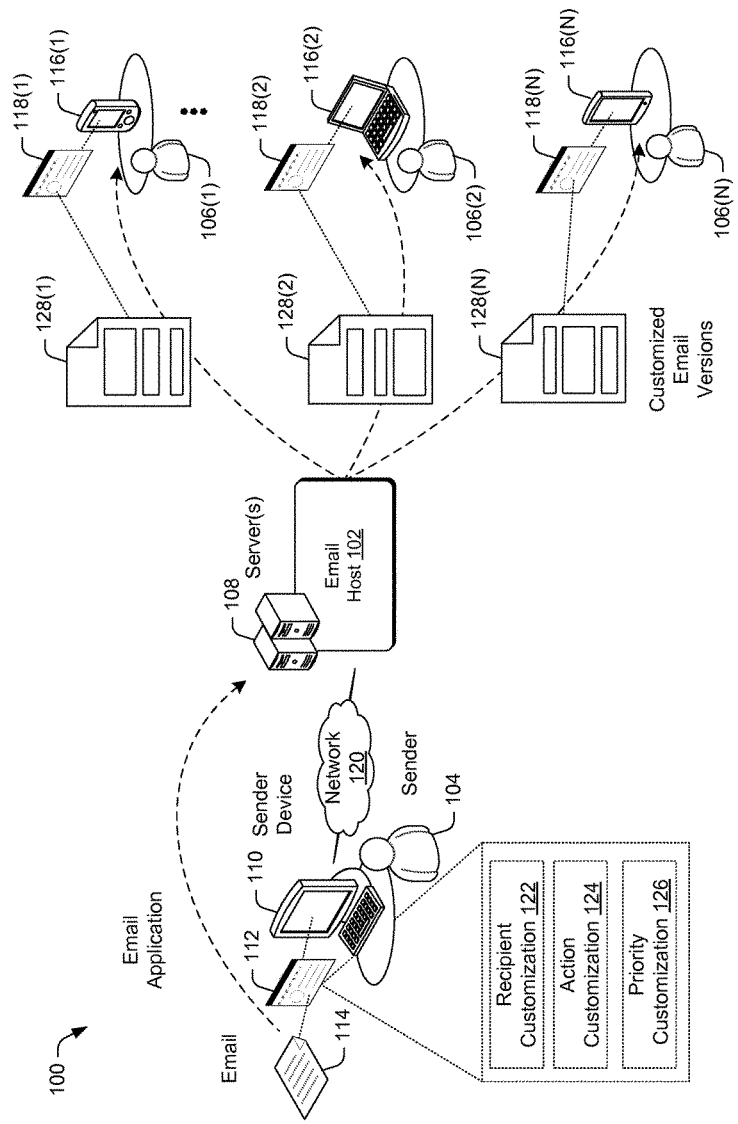
FIG. 1 is a schematic diagram of an illustrative architecture for implementing various embodiments of customized electronic document distribution.

FIG. 1 is a schematic diagram of an illustrative architecture 100 for implementing various embodiments of customized electronic document distribution. The architecture 100 may include an email host 102, an email sender 104, and email recipients 106(1)-106(N). The email host 102 may operate one or more servers 108. The servers 108 may deliver emails that are created by senders (e.g., email sender 104) to one or more email recipients, such as the email recipients 106(1)-106(N). The servers 108 may route the emails from a sender to the recipients according to the recipient information that is included in the headers of the emails. In various embodiments, the servers 108 may include a post office protocol (POP) mail server, a simple mail transfer protocol (SMTP) server, an internet message access protocol (IMAP) server, and/or so forth.

The email sender 104 may send emails using a sender device 110. The sender device 110 may be a mobile communication device, a smart phone, a portable computer, a tablet computer, a desktop computer, a slate computer, or any other electronic device that is equipped with network communication components to receive and transmit data, data processing components to process data, and/or user interface components to receive data from and present data to a user. The sender device 110 may execute an email application 112. The email application 112 may be a client application that communicates with the servers 108 to enable the email sender 104 to compose, send, and receive email messages. For example, the email sender 104 may use the email application 112 to compose an email 114 for delivery to the email recipients 106(1)-106(N). The email application 112 may upload the email 114 to a remote mail storage provided by the servers 108, such that the email 114 may be retrieved from the remote mail storage by the email recipients 106(1)-106(N).

The email recipients 106(1)-106(N) may use the recipient devices 116(1)-116(N) to retrieve emails from the servers 108. Each recipient device may be a mobile communication device, a smart phone, a portable computer, a tablet computer, a desktop computer, a slate computer, or any other electronic device that is equipped with network communication components to receive and transmit data, data processing components to process data, and user interface components to receive data from and present data to a user. Further, the recipient devices 116(1)-116(N) may execute email applications 118(1)-118(N), respectively. Each of the email applications 118(1)-118(N) may be substantially similar in terms of functionality and operation as the email application 112. Accordingly, each of the email recipients 106(1)-106(N) may use a corresponding email application to retrieve emails from the servers 108. The sender device 110 and the recipient devices 116(1)-116(N) may communicate with the servers 108 through a network 120. The network 120 may be a local area network ("LAN"), a larger network such as a wide area network ("WAN"), or a collection of networks, such as the Internet.

In various embodiments, the email application 112 and the email applications 118(1)-118(N) may include features and functionalities that enable users to customize the distribution and the display of the emails. The customization may include recipient customization 122. In recipient customization, an email application (e.g., email application 112) may enable a user (e.g., the email sender 104) to designate a portion of a composed email as general, and designate another portion of the composed email as private. Accordingly, a group of recipients may receive a general portion of the email, while a particular recipient of the group of recipients may receive both the general portion and the private portion of the email. In such instances, the email host 102 may be responsible for routing the one or more appropriate portions of an email to different recipients based on the designations inputted at an email application.

The customizations may also include action customization 124. In action customization 124, an email may be customized for distribution so that upon receipt by multiple recipients, the email is marked in different ways for different recipients. For example, the email may be marked as informational for a first recipient, while marked as including a task for completion for a second recipient. The markings may be accomplished using different color markings, different shading, different legends, different size fonts or text emphases, and/or another indication. In this way, the first recipient may not take any action for the electronic device, while the second recipient may be compelled to complete a task that is described in the email. In some instances, emails that are customized via action customization 124 may include embedded task events for updating a project management application on a recipient device of the email recipient and/or appointment events for updating a calendar application on the recipient device. In at least one instance, the project management application may be a team collaboration application that assigns and tracks tasks performed by multiple team members.

Additionally, the customization may further include priority customization 126. The priority customization 126 may be performed by an email sender using an email application on a sender device, or by an email recipient using an email application on a recipient device. In the first scenario, the email sender may use an email application (e.g., email application 112) to mark an email with an email priority value (e.g., priority values 1, 2, 3, 4, or 5) before sending the email to an email recipient. In some instances, the email sender may mark a single email with different email priority values for multiple email recipients. When the email arrives at the recipient email application of the email recipient, the recipient email application may automatically place the email in an email inbox priority folder that corresponds to the category priority value. Alternatively or concurrently, the recipient email application may assign a priority indicator to the email or the email header of the email shown in a preview pane based on the email priority value. The priority indicator may be in the form of a corresponding color marking, corresponding shading, a corresponding legend, a corresponding font size or text emphasis, and/or another indication.

In the scenario in which the priority customization is performed by a recipient email application (e.g., the email application 118(1)), the recipient email application may be configured to classify and mark incoming emails according to the identity of the sender. For example, the recipient email application may be configured to assign a highest priority value to incoming emails that originate from a first group of email addresses, assign a lower priority value to incoming emails that originate from a second group of email address, and so forth. The different priority values may enable the recipient email application to visually present the emails differently to the recipient. For example, incoming emails of different priority values may be stored in different inbox folders, assigned different color markings, provided with different shadings, presented using different font sizes or text emphasis, and/or another indication.

With respect to the email 114 that is sent by the email sender 104, the content distribution customizations may enable the recipients 106(1)-106(N) to receive customized email versions 126(1)-126(N) of the email 114. For example, the recipient customization 122 may cause the recipient 106(1) to receive the email version 128(1) that has a general portion of the email 114, while the recipient 106(2) receives the email version 128(2) that includes both the general portion and a corresponding private portion of the email 114. In another example, the action customization 124 may cause the recipient 106(2) to receive the email version 128(2) of the email 114 that is marked as informational, while the email version 128(N) of the email 114 that is received by the recipient 106(N) may be marked as including a task for completion. In an additional example, the priority customization 126 may cause the recipient 106(1) to receive the email version 128(1) of the email 114 that is marked as a having a priority value of "1", while the email version 128(2) of the email 114 that is received by the recipient 106(2) may be marked as having a priority value of "2".

In various embodiments, an email may be customized using a combination of one or more of the recipient customization 122, action customization 124, and priority customization 126. For example, the email 114 may be customized using recipient customization 122 so that a general portion of the email 114 is received by multiple recipients, while a private portion of the email 114 is received by a particular recipient. However, the email 114 may be further customized so that the private portion that is received by the particular recipient is marked with an informational indicator. The entire email 114 may also be concurrently marked with a priority value of "1" for all the recipients.

Further, while the recipient customization 122, the action customization 124, and priority customization 126 are discussed in the context of emails that are distributed by an email host 102 and email applications 112 and 118(1)-118 (N), the customizations are also applicable to other forms of electronic documents. For example, similar customizations may also be applied to word processing documents, spreadsheets, slide-based presentations, and/or other types of documents that are transmitted via emails. In such an example, office productivity applications may perform customization functions on the client device.

Example Server Modules

Figure 2:
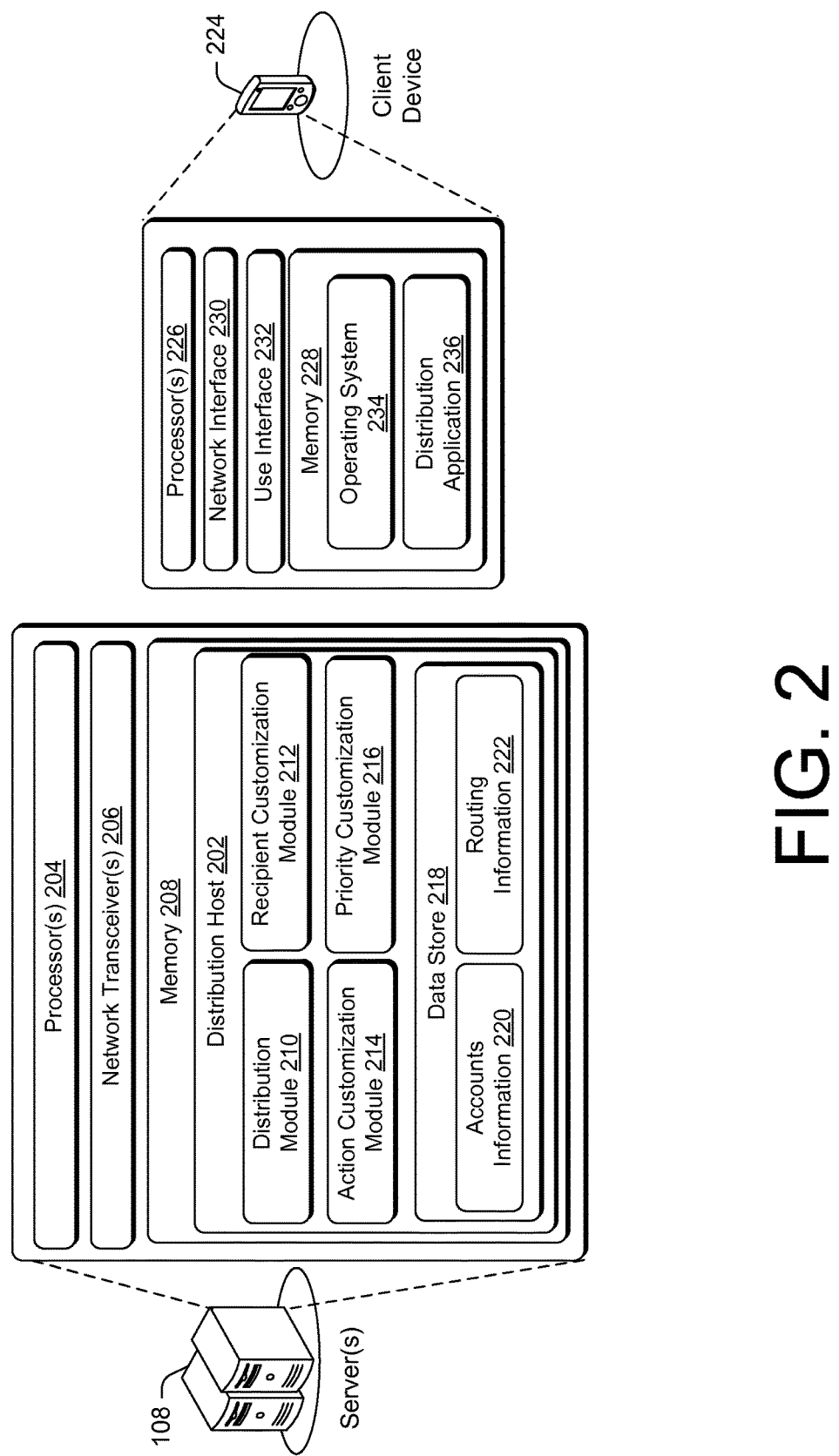
FIG. 2 is a schematic diagram of illustrative components in an example distribution host that performs electronic document distribution according to content distribution settings, and an example client device that is used to compose the electronic documents and customize the content distribution settings.

FIG. 2 is a schematic diagram of illustrative components in an example distribution host that performs electronic document distribution according to content distribution settings, and an example client device that is used to compose the electronic documents and customize the content distribution settings. The example distribution host 202 may be the email host 102.

The distribution host 202 may be implemented by the one or more servers 108. The servers 108 may include processor(s) 204, network transceiver(s) 206, and memory 208. The network transceiver(s) 206 may include wireless and/or wired communication components that enable the servers 108 to transmit data to and receive data from other servers and devices via the network 120. The memory 208 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms. In some embodiments, one or more of the servers 108 may be mailbox servers that store emails for multiple recipients.

The distribution host 202 may implement a distribution module 210, a recipient customization module 212, an action customization module 214, and a priority customization module 216. The modules may include routines, programs, instructions, objects, and/or data structures that perform particular tasks or implement particular abstract data types. The servers 108 may also implement a data store 218 that stores data used by the distribution host 202.

The distribution module 210 may include mail components that handle the routing of emails to multiple email recipients. In at least one embodiment, the distribution module 210 may include a mail transfer component and a mail delivery component. The mail transfer component may be an application that is responsible for the resolution of mail addresses and the routing of mail messages. For example, the mail transfer component may receive emails from email applications and other mail transfer agents, resolve destination email addresses, and select a mail delivery component to deliver the mail. The mail delivery component may be responsible for delivering emails to mailbox file of recipients. In various embodiments, the distribution module 210 may include other mail components that are associated with an email system.

The recipient customization module 212, the action customization module 214, and the priority customization module 216 may work cooperatively with the distribution module 210 to customize incoming emails that are received by the distribution module 210 before they are delivered to the mailboxes of email recipients by the distribution module 210. The customization of the incoming emails may be performed according to customization settings provided by email senders. Accordingly, an email application of a sender device may deliver the customization settings for an email to the distribution host 202 as metadata that is embedded in the email.

The recipient customization module 212 may perform the content portion routing aspect of the recipient customization 122 according to the embedded metadata. The content portion routing may be performed using multiple versions of an email. For example, a sender may designate a first portion of the email 114 as a general portion for a group of recipients, and a second portion of the email 114 as a private portion for a particular recipient or recipients. In such an instance, the recipient customization module 212 may format the email 114 into two different versions. The first version, which is for the group of recipients, has the first portion. The second version, which is for the particular recipient, has both the first and second portions. The recipient customization module 212 may also append the appropriate recipient information to each version based on the user designations. Subsequently, the recipient customization module 212 may direct the distribution module 210 to distribute the two versions to the appropriate recipients.

The action customization module 214 may perform the content marking aspect of the action customization 124 according to the embedded metadata. For example, a sender may desire to send an email to two recipients, in which the email is intended to outline a task that is to be completed by a first recipient, while the second recipient is being copied on the email for the purpose of keeping the second recipient informed. Accordingly, the action customization module 214 may provide each of the two versions of the email with a corresponding indicator (e.g., informational vs. task to be completed), and direct the distribution module 210 to send the task version to the first recipient and the informational version to the second recipient. In various embodiments, the marking of each version may be accomplished so that the versions will eventually be displayed with different color markings, different shadings, different outlines, different legends, different size fonts or text emphases, and/or another indication. In some embodiments, the action customization module 214 may also perform similar marking operations with respect to one or more content portions of an email rather than an email in its entirety.

The priority customization module 216 may perform the content portion routing aspect the priority customization 126. For example, a sender may desire to send the email 114 to two recipients, in which the version of the email 114 that is for a first recipient is assigned a priority value of "1", and the version of the email 114 that is for a second recipient is assigned a priority value of "2". In such an instance, the recipient customization module 212 may generate the two version of the email 114, each with the appropriate priority value. Subsequently, the priority customization module 216 may direct the distribution module 210 to distribute the two versions to the appropriate recipients.

The data store 218 may store the data that are used by the modules of the distribution host 202. In various embodiments, the data store 218 may store account information 220. The account information 220 may include email addresses and alias that are used by the distribution module 210 to resolve destination emails. Additionally, the data store may store content routing information 222 that assists the distribution module 210 in delivering emails to mailbox files stored in the servers 108.

The example client device 224 may be the sender device 110 or one of the recipient devices 116(1)-116(N). The client device 224 may include processor(s) 226 and memory 228. The memory 228 may include computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

The client device 224 may also include network interface 230 and user interface 232. The client device 224 may also include one or more hardware components, such as a global position locator (e.g., GPS chip), an internal clock, a sound card, a video card, a camera, device interfaces, motion sensors, inertia sensors, proximity sensors, a compass, biometric sensors, telephony components, and/or another indication. The network interface 230 may include wireless and/or wired communication components that enable the client device 224 to transmit data to and receive data from other devices via the network 120. For example, the network interface 230 may include a cellular communication transceiver, a wired network interface transceiver, and/or so forth.

The user interface 232 may enable a user to provide inputs and receive outputs from the client device 224. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. Thus, a user may use the user interface 232 to interface with the applications on the client device 224.

The memory 228 may store an operating system 234 and a distribution application 236. The operating system 234 may include components that enable the client device 224 to receive data via various inputs via the user interface 232, process the data using the processor(s) 226 to generate output. The operating system 234 may further include one or more components that present the output, including display data using the user interface 232, store data in memory, transmit data to another electronic device, and/or so forth. Additionally, the operating system 234 may include other components that perform various additional functions generally associated with an operating system, such as providing an execution environment for applications that are installed on the client device 224. In various instances, the operating system 234 may use the biometric sensors (e.g., a fingerprint reader) on the client device 224 to restrict and authorize access to the applications and features of the client device 224.

The distribution application 236 may use the execution environment provided by the operating system 234 to interface with a user and the distribution host 202. Accordingly, the distribution application 236 may enable the user to compose, send, and receive email messages. The distribution application 236 may also enable the user to perform one or more of the recipient customization 122, the action customization 124, and the priority customization 126 via one or more user interfaces. While some of the operations that are performed by the distribution host 202 and the distribution application 236 are described with respect to FIG. 1, additional details regarding such operations are described below in FIGS. 3-10.

Example User Interface

Figure 3:
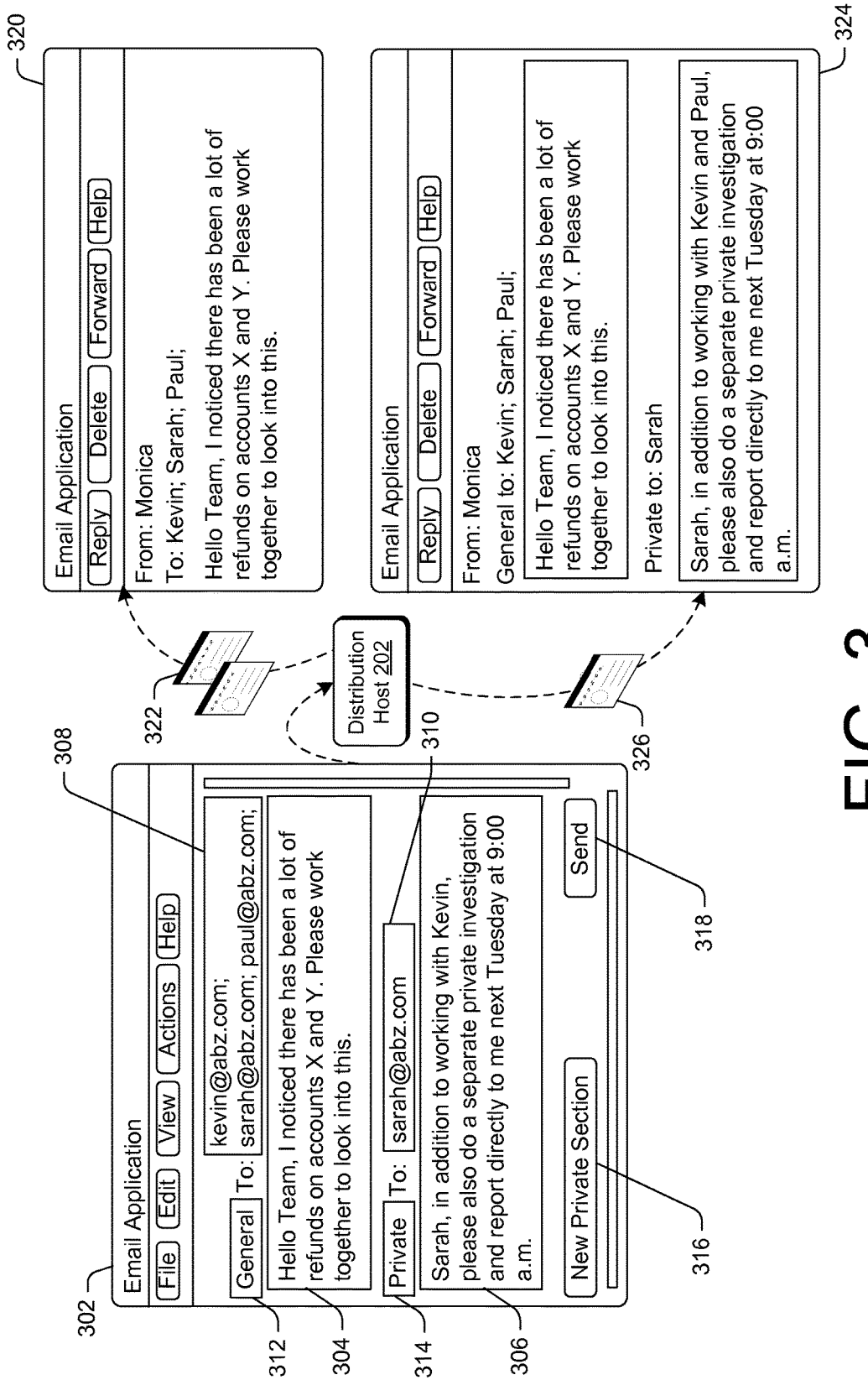
FIG. 3 shows an illustrative user interface window for customizing a portion of an electronic document as general content and another portion of the electronic document as private content.

FIG. 3 shows an illustrative user interface window 302 for customizing a portion of an electronic document as general content and another portion of the electronic document as private content. In the example shown in FIG. 3, the electronic document may be an email. The user interface window 302 may be displayed by an email application on a sender device, such as the email application 112. The user interface window 302 may include multiple write panes, such as write panes 304 and 306. Each of the write panes may include a recipient field in which the sender may input recipient email addresses, email alias, nick names, or recipient identification information. For example, the write pane 304 may have a recipient field 308, and the write pane 306 may have a recipient field 310. The recipient fields 308 and 310 may respectively have recipient customization settings 312 and 314. Each of the recipient customization setting may be set to "general" or "private." The "general" setting configures the content that is inputted into the associated write pane for delivery to all the recipients in the corresponding recipient field. In contrast, the "private" setting configures the content that is inputted into the associated write pane for delivery to the one or more specific recipients that are inputted into the corresponding recipient field. The user interface window 302 may further include a new private section control option 316. The activation of the new private section control option 316 may generate a new private write pane. In this way, the user interface window 302 may enable the generation of an email that includes multiple private sections that are for different recipients. In some embodiments, the email application may be configured such that each recipient email address that is set to the "private" setting is chosen from the one or more recipient email addresses that are inputted into the "general" setting. Accordingly, once the sender has completed the composition of the email using the multiple write panes, the sender may activate the send control option 318 to transmit the email to the distribution host 202.

In turn, the distribution host 202 may route the email to the email applications of the recipients. The user interface window 320 shows a version of the email that is delivered to the email applications 322 of the "general" recipients, and the user interface window 324 shows a version of the email that is delivered to the email application 326 of the "private" recipient. As shown, the version of the email displayed in the user interface window 320 includes the general content of the email. However, the version of the email displayed in the user interface window 324 includes both the general content and the private content of the email.

Figure 4:
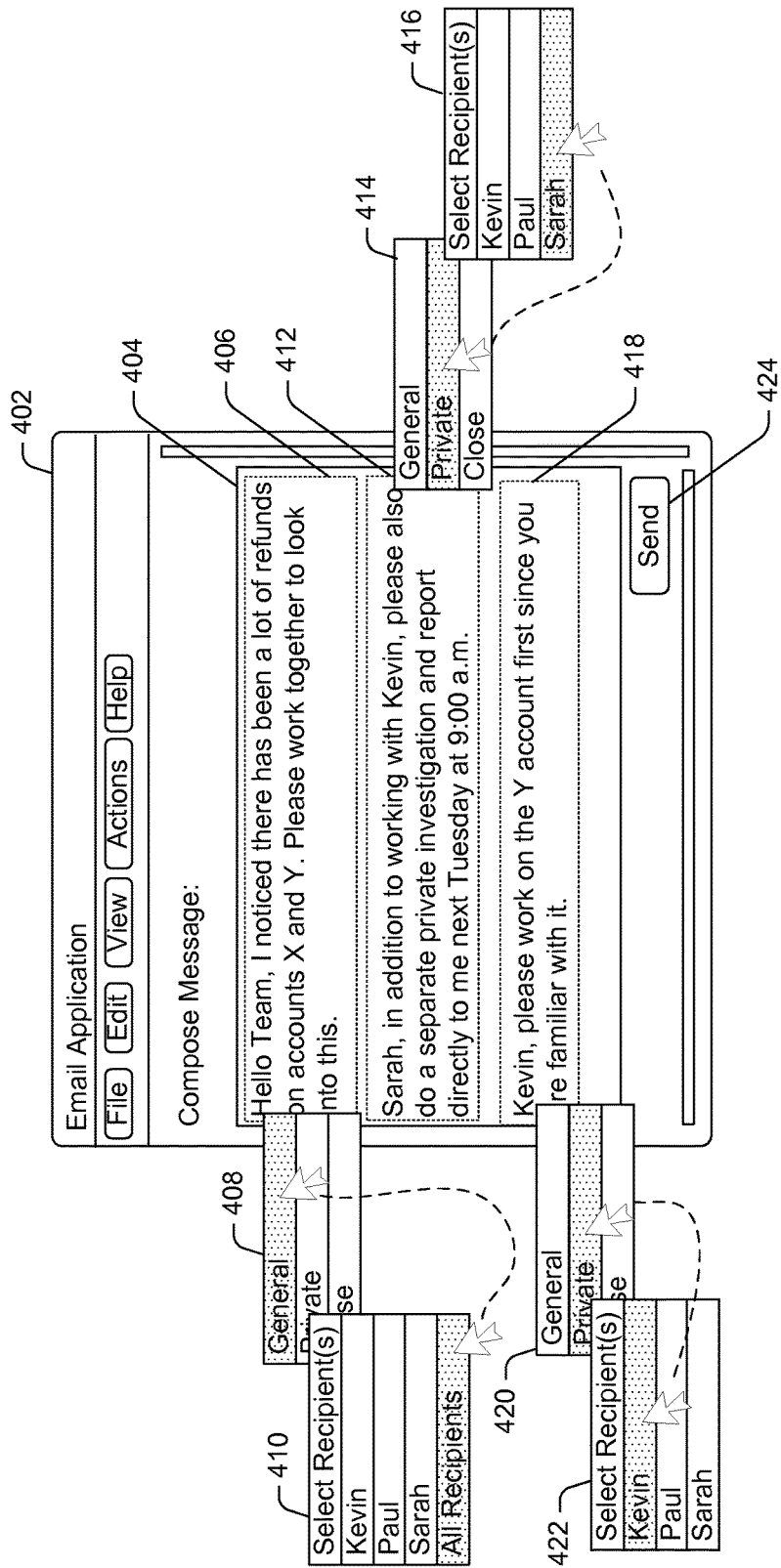
FIG. 4 shows an alternative illustrative user interface window for customizing a portion of an electronic document as general content and another portion of the electronic document as private content.

FIG. 4 shows an alternative illustrative user interface window 402 for customizing a portion of an electronic document as general content and another portion of the electronic document as private content. In the example shown in FIG. 4, the electronic document may be an email. The user interface window 402 may be displayed by an email application on a sender device, such as the email application 112. The user interface window 402 may include a write pane 404 in which the sender may compose an email. Following the composition of the email, the sender may assign recipients to the different sections of the email. For example, the sender may select a section 406 by highlighting the section. The highlighting of the section may involve dragging a pointer device or sensed touch over the entirety of the section or otherwise selecting the section from the email. Subsequently, the sender may activate a recipient customization control 408 for the section 406. The recipient customization control 408 may be activated via a pointer control click or a menu option for the user interface window 402. The recipient customization control 408 includes a "general" setting and a "private" setting. The "general" setting configures the content that is highlighted for delivery to multiple recipients. In contrast, the "private" setting configures the content that is highlighted for delivery to one or more specific recipients. Accordingly, once the sender has selected the "general" setting, the email application may instantiate a recipient selection control 410. The recipient selection control 410 may enable the sender to select the specific recipients that are to receive the section 406. In various embodiments, the recipient selection control 410 may be populated with potential recipients that are stored in an email address list of the email application, or email addresses in the email address list that are associated with one or more specific email aliases. For example, the recipients of the general section in this scenario may include "Kevin," "Paul," and "Sarah."

Furthermore, the sender may select a section 412 by highlighting the section. Subsequently, the sender may activate a recipient customization control 414 for the section 412. The recipient customization control 414 may be activated via a pointer control click or a menu option for the user interface window 402. Unlike with respect to the recipient customization control 408, the sender may select a "private" setting of the recipient customization control 414. Accordingly, once the sender has selected the "private" setting, the email application may instantiate a recipient selection control 416. The recipient selection control 416 may enable the sender to select one or more specific recipients that are to receive the section 412 that is private along with the section 406 that is public. For example, the recipient of the private section 412 in this scenario is "Sarah." In some embodiments, the email application may be configured such that each recipient email address that selected in the "private" setting for the section 412 is chosen from the one or more recipient email addresses that are selected in the "general" setting for the section 406.

As further shown in FIG. 4, a sender may further select a section 418 by performing a procedure similar to the procedure as described for the highlighted section 412. Accordingly, the sender may use the recipient customization control 420 and the recipient selection control 422 to select one or more specific recipients to receive the section 418 that is private, in which the one or more specific recipients also receives the section 406 that is public. For example, the recipient of the private section 418 in this scenario is "Kevin." Once the sender has highlighted and customized recipients for the sections of the email, the sender may activate the send control option 424 to transmit the email to the distribution host 202.

Figure 5:
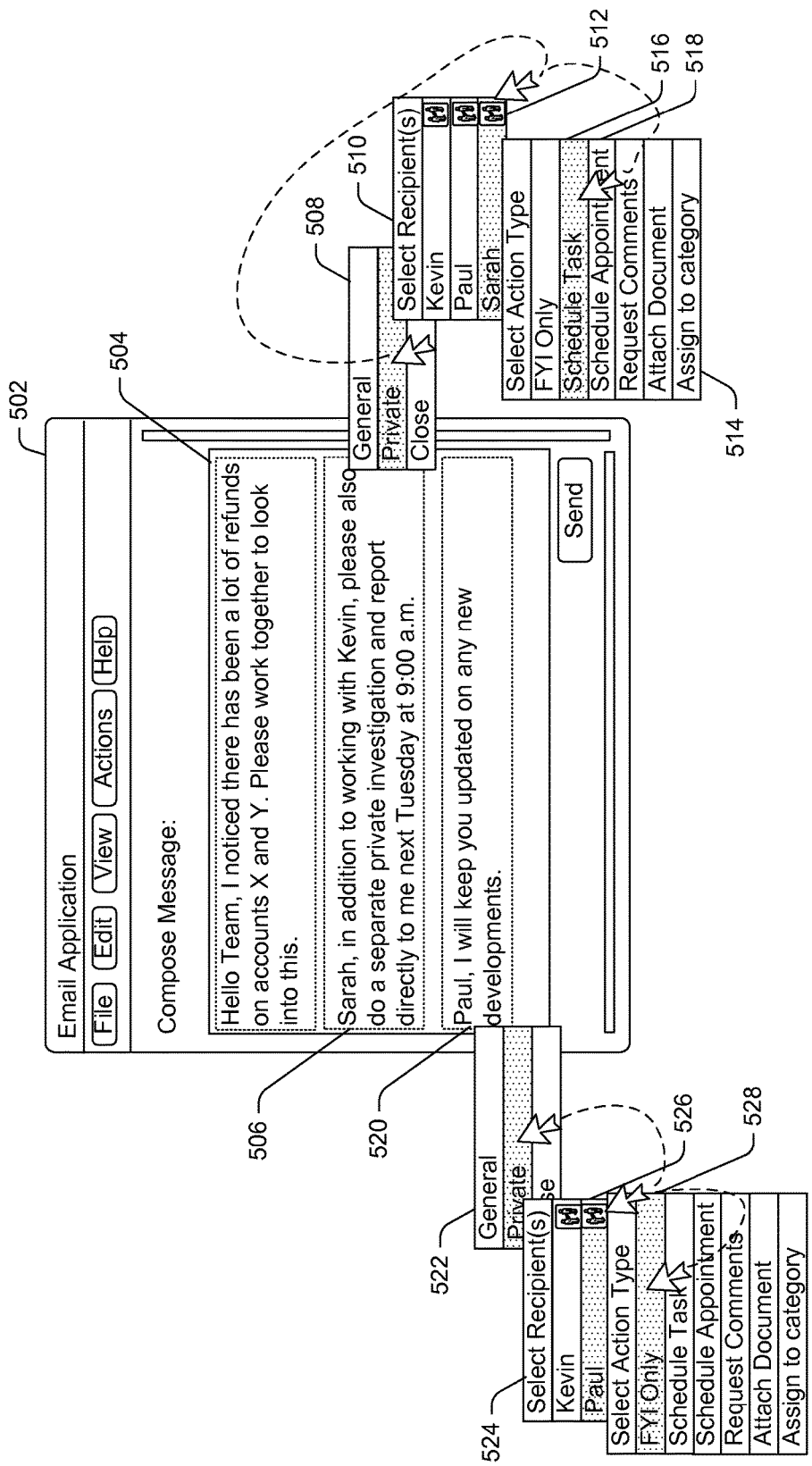
FIG. 5 shows an illustrative user interface window for customizing a portion of an electronic document as informational content for a first recipient and another portion of the electronic document as including a task for a second recipient.

FIG. 5 shows an illustrative user interface window for customizing a portion of an electronic document as informational content for a first recipient and another portion of the electronic document as including a task for a second recipient. In the example shown in FIG. 5, the electronic document may be an email. The user interface window 502 may be displayed by an email application on a sender device, such as the email application 112. The user interface window 502 may include a write pane 504 in which the sender may compose an email. Following the composition of the email, the sender may assign recipients to the different sections of the email. The user interface window 502 illustrates that the recipient customization control for a content section may include options for action customization.

For example, the sender may select a section 506 by highlighting the section. The highlighting of the section may involve dragging a pointer device or sensed touch over the entirety of the section or otherwise selecting the section from the email. Subsequently, the sender may activate a recipient customization control 508 for the section 506. The recipient customization control 414 may be activated via a pointer control click or a menu option for the user interface window 402. Subsequently, the sender may select a "private" setting of the recipient customization control 508. Accordingly, once the sender has selected the "private" setting, the email application may instantiate a recipient selection control 510. The recipient selection control 510 may enable the sender to select one or more specific recipients that are to receive the section 506. For example, the recipient of the section 506 in this scenario is "Sarah." However, the recipient selection control 510, as well as other recipient selection controls for the user interface window 502, may include action control options. For example, the recipient selection control 510 may include the action control option 512. Upon the activation of the action control option 512, the email application may instantiate an action selection menu 514.

The action selection menu 514 may enable the sender to designate the section 506 as containing content that is informational only, as containing content that is related to a task to be completed, as containing content that is related to an appointment, and/or another indication. In alternative embodiments, the action selection menu 514 may include menu items, such as menu items 516 and 518, which enable the sender to schedule a task to be completed or schedule an appointment. For example, the selection of the menu item 516 may cause the email application to instantiate a task schedule window in which the sender may configure a start date for a task, a completion date for the task, the responsible party for the task, and a nature of the task. In another example, the selection of the menu item 518 may cause the email application to instantiate an appointment window in which the sender may configure an appointment time, participants for the appointment, location of the appointment, contact information for the appointment, and/or so forth. The entry of such information may enable the distribution host 202 to transmit the task and/or appointment information to a recipient email application or project management application, as illustrated with respect to FIG. 6 below.

Figure 6:
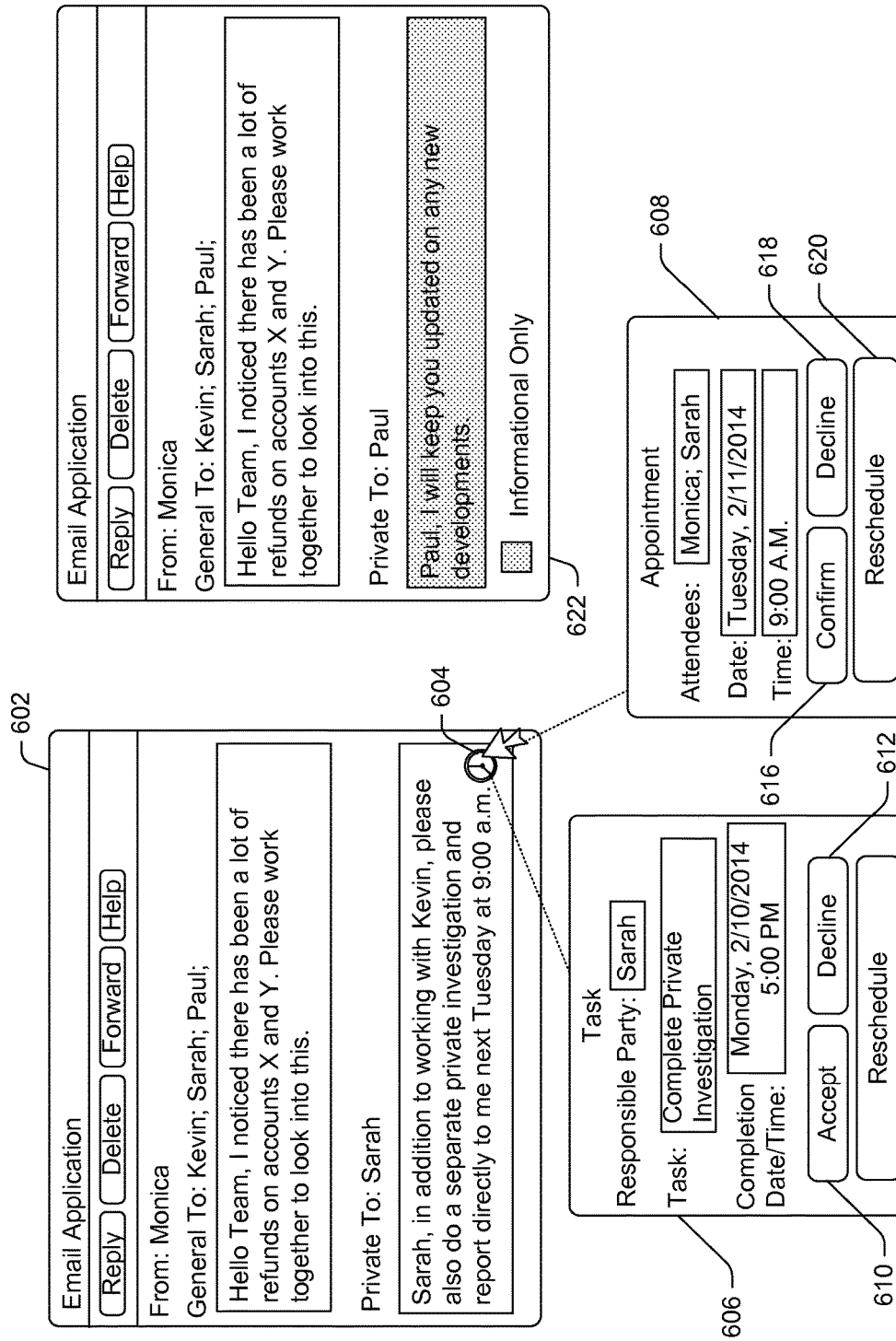
FIG. 6 shows illustrative user interface windows that display a portion of an electronic document as informational content and display a second portion of the electronic document as including a task and an appointment.

Additionally, the sender may select a section 520 by highlighting the section. Subsequently, the sender may designate the section 520 as containing informational content from a recipient "Paul." The designation may be accomplished through a similar series of controls as the designation of the section 506. As such, the sender may use a recipient customization control 522, a recipient selection control 524, an action control option 526, and a menu item 528 to designate the section 520 as containing informational content. As illustrated in FIG. 6, a version of the email reflecting the designated section 520 may be displayed to the email recipient. While the action customization 124 is described in FIG. 5 as being performed with respect to content section in an email, the action customization 124 may also be performed with respect to emails in their entirety. The customization may be performed using a menu item provided by the email application similar to the menu items 518 and 528, which can be activated by the sender to perform the action customization 124.

FIG. 6 shows illustrative user interface windows that display a portion of an electronic document as informational content and display a second portion of the electronic document as including a task and an appointment. In the example shown in FIG. 6, the electronic document may be an email. The user interface window 602 may display a version of the email that is customized via the action control option 512 of the recipient selection control 510. The user interface window 602 may be displayed by an email application on a recipient device, such as the recipient device 116(1). As shown, the email may include both the general content and the private content. However, the email may further include an embedded link 604 in the private content. The embedded link 604 may initiate display of a task schedule control 606 and/or an appointment schedule control 608. The task schedule control 606 may provide information on a task that is to be performed by the recipient. For example, the task schedule control 606 may include information such as the party responsible for completing the task, the nature of the task, the planned completion date for the task and/or another indication. The task schedule control 606 may include an accept option 610, a decline option 612, and a reschedule option 614. The activation of the accept option 610 may add the task to a calendar application or a project management application. In some embodiments, the calendar application or the project management application may be a subcomponent of the email application that displays the user interface window 602. The email recipient may use the decline option 612 to decline the task or the reschedule option 614 to reschedule the task.

The appointment schedule control 608 may provide information regarding an appointment that involves the recipient. For example, the appointment schedule control 608 may include information such as the attendees for the appointment, the time and date of the appointment, the location of the appointment, and/or another indication. The appointment schedule control 608 may further include a confirm option 616, a decline option 618, and a reschedule option 620. The activation of the confirm option 616 may add an appointment to a calendar application. However, the email recipient may use the decline option 618 to decline the task or the reschedule option 620 to reschedule the task.

The user interface window 622 may display a version of the email that is customized via the action control option 526 of the recipient selection control 524. The user interface window 622 may be displayed by an email application on a recipient device, such as the recipient device 116(2). This version of the email may include a private content section that is marked with an indicator that signals that the private content is informational in nature. In this example, the informational indicator may be a color shading of the private content in a particular color that signals the content as informational.

Figure 7:
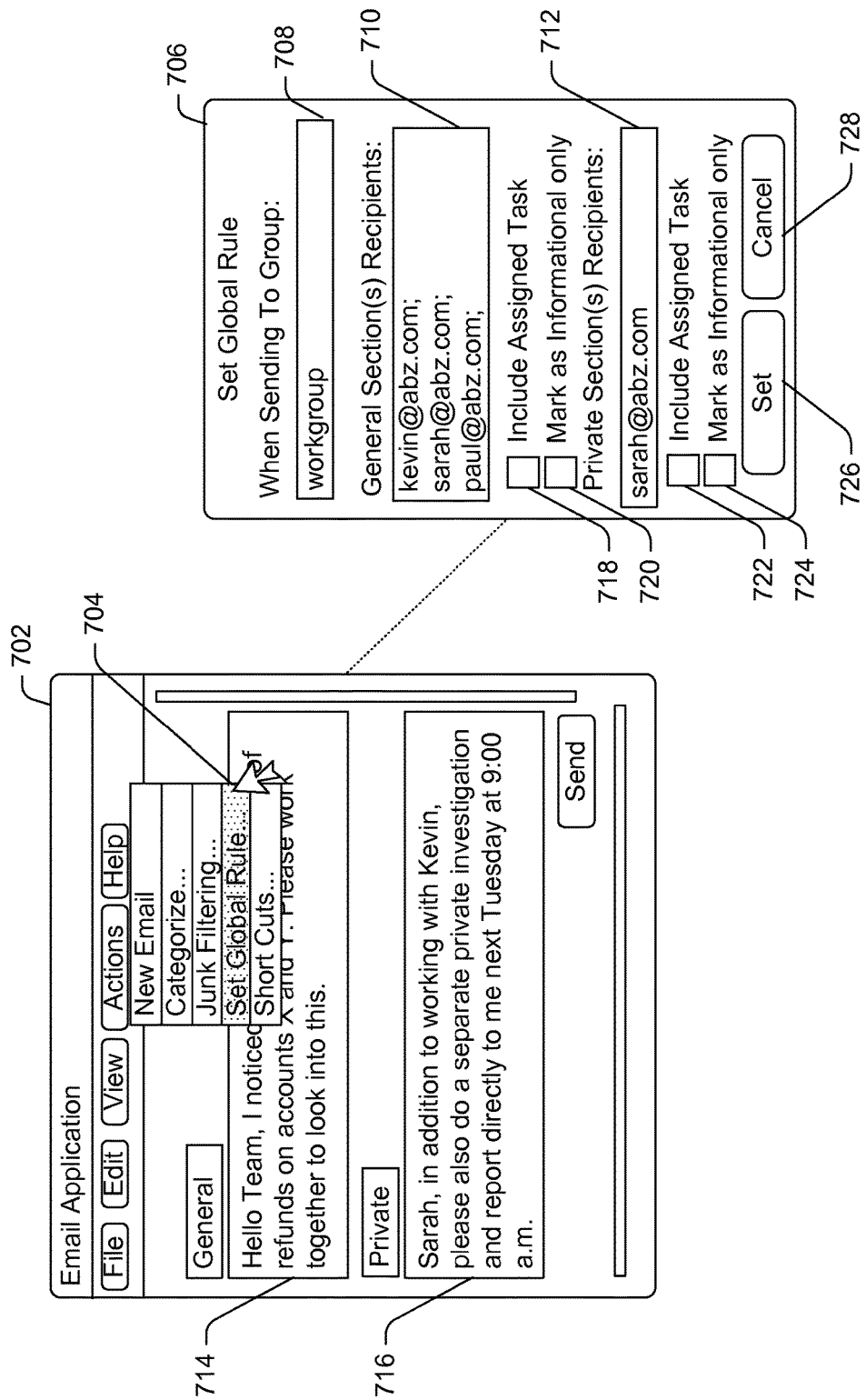
FIG. 7 shows illustrative user interface windows that display a user interface control for setting a global rule that regulates the customized distribution of an electronic document.

FIG. 7 shows illustrative user interface windows that display a user interface window 702 for setting a global rule that regulates the customized distribution of an electronic document. In the example shown in FIG. 7, the electronic document may be an email. The user interface window 702 may be displayed by an email application on a sender device, such as the email application 112. User control of the user interface window 702 may include a set global rule menu item 704. The activation of the set global rule menu item 704 may cause the email application to instantiate the global rule configuration control 706. The global rule configuration control 706 may include a target field 708. For example, the target field 708 may be a place for the entry of a group email alias. The global rule configuration control 706 may further include a general recipient input field 710 and a private recipient field 712. The general recipient input field 710 may be used to designate recipients for the email content portion that is inputted into a general content write pane 714. Accordingly, a sender may use the general content write pane 714 to compose email content for multiple recipients of the email. On the other hand, the private recipient field 712 may be used to designate one or more recipients for the email content portion that is inputted into a private content write pane 716. Accordingly, a sender may use the write pane 714 to compose email content that is exclusively for the one or more recipients named in the private recipient field 712.

In some embodiments, each of the general recipient input field 710 and the private recipient field 712 may be associated with additional options for setting global rules with respect to the action customization 124 and/or priority customization 126. For example, the general recipient input field 710 may include checkboxes 718 and 720. The checkbox 718 may enable a predetermined task to be assigned to the one or more recipients that are to receive the email content portion inputted into the general content write pane 714. The predetermined task (e.g., a recurring weekly meeting) may be assigned via another user interface window. The check box 720 may enable the marking of the email content portion that is inputted into the general content write pane 714 as being informational, such that no action needs to be taken with respect to the email content. As further shown in FIG. 7, the private recipient field 712 may be similar provided with checkboxes 722 and 724. The checkbox 722 may enable a predetermined task to be assigned to the one or more recipients that are to receive the email content portion inputted into the private content write pane 716. In this instance, the recipient "Sarah" may have a predetermined task (e.g., a recurring weekly meeting) assigned. The check box 724 may enable the marking of the email content portion that is inputted into the private content write pane 716 as being informational. In other examples, each of the general recipient input field 710 and the private recipient field 712 may be concurrently or alternatively provided with priority category customization options that enables global priority category values to be assigned. In this way, the global rule configuration control 706 may enable the assignment of global rules with respect to any combination of recipient customization 122, action customization 124, and/or priority customization 126. The activation of the set option 726 causes the email application to store the inputted global rules for future use, while the activation of the cancel button 728 discards any information inputted into the global rule configuration control 706.

In other embodiments, the target field 708 may be configured to accept other parameters that trigger the application of a global rule with respect to email recipients. Such parameters may include a particular word or phrase entered into the subject line of an email, a particular word or phrase in the name of an electronic document, an explicit selection of a global setting parameter, a time of day, a day of the month, and/or so forth.

Figure 8:
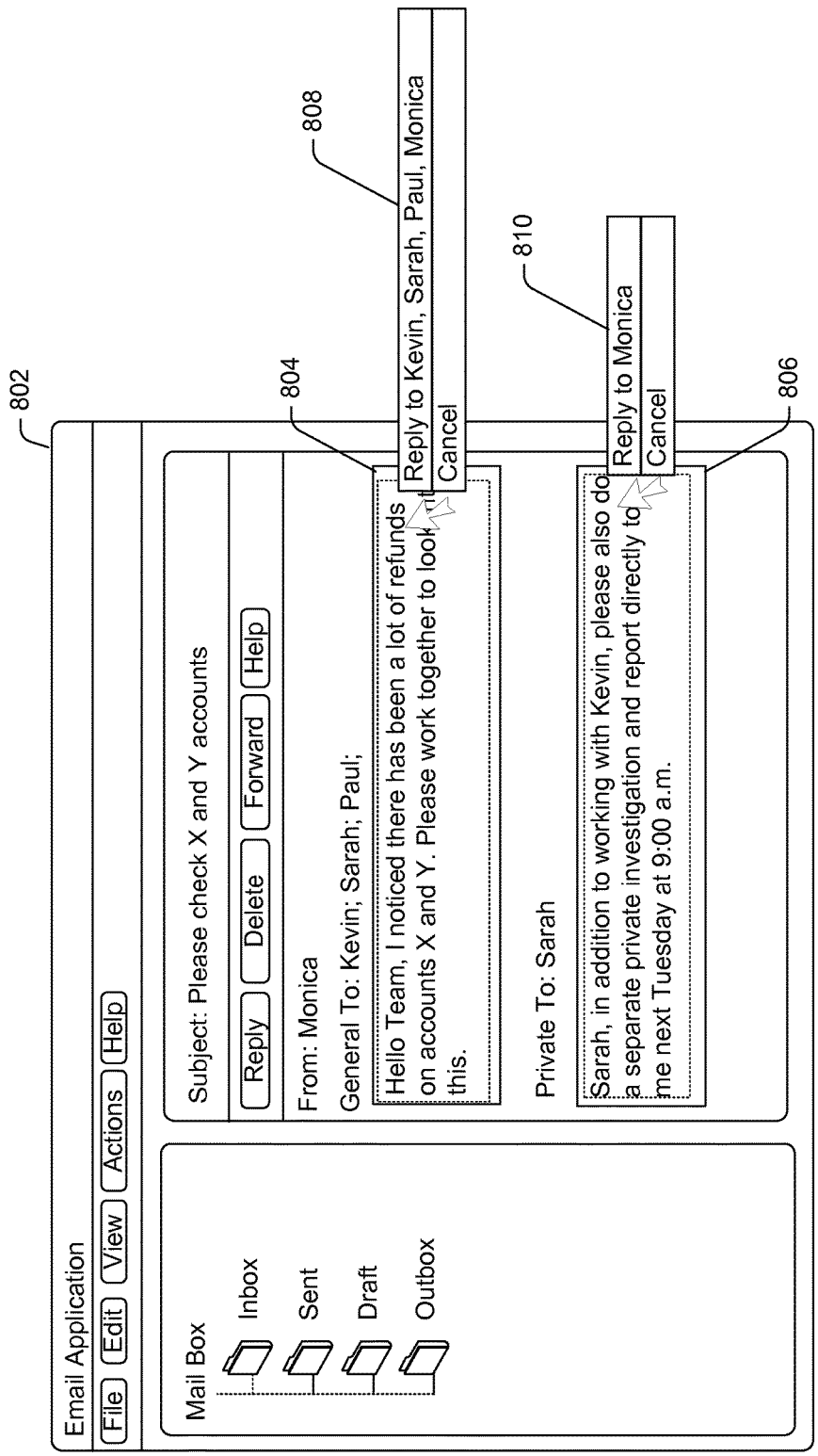
FIG. 8 shows an illustrative user interface window that displays different reply recipients for an electronic document based on the portion of the electronic document selected by a user.

FIG. 8 shows an illustrative user interface window 802 that displays different reply recipients for an electronic document based on the portion of the electronic document selected by a user. In the example shown in FIG. 8, the electronic document may be an email. The user interface window 802 may be displayed by an email application on a recipient device, such as the email application 118(1). The user interface window 802 may show an email that is in an email inbox. The email may include general content 804 that was sent to multiple recipients, as well as private content 806 that is specifically and exclusively sent to the particular recipient. Accordingly, the recipient may select different portions of the email to designate the recipients of a response email. The selection may be accomplished by activating a control while a pointer device or sensed touch is over a particular portion. For example, if the recipient selects the general content 804, the email application may provide an option 808 to automatically populate the recipient field of the response email with the email addresses of the sender as well as all the recipients of the original email. However, if the recipient selects the private content 806, the email application may provide an option 810 to automatically populate the recipient field of the response email solely with an email address of the original sender. The version of the response email that results from the use of the option 808 may include the general content 804 and exclude the private content 806. In this way, the one or more recipients of the response email may build off of the general content 404 in composing reply emails and continuing the email thread. On the other hand, the version of the response email that results from the use of the option 808 may include both the general content 804 and the private content 806. In this way, a recipient may build off of both the general content 804 and the private content 806 in another reply email in order to continue the email thread.

Figure 9:
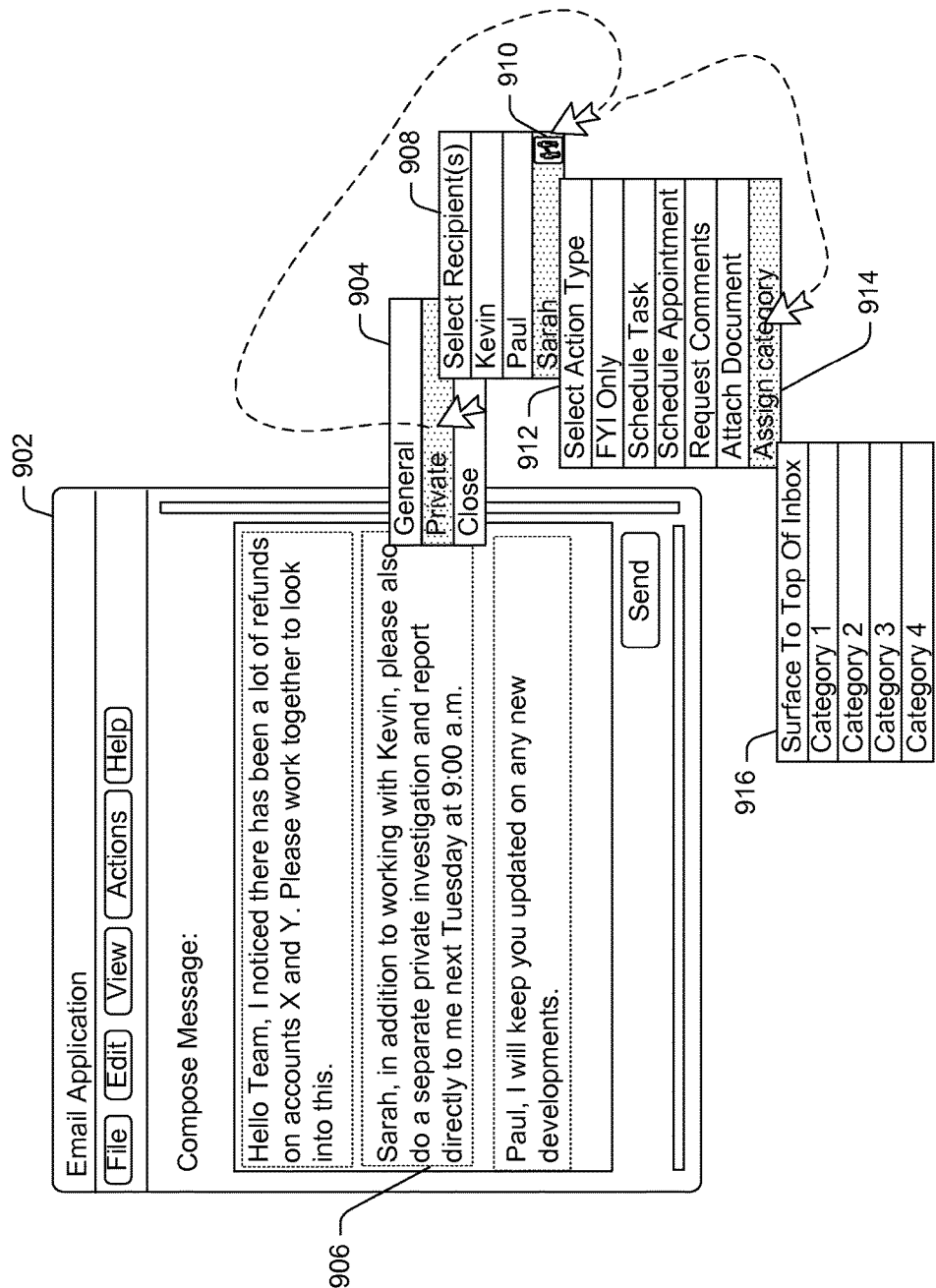
FIG. 9 shows an illustrative user interface window that displays an option that enables a sender to assign a priority category value to an electronic document such that the electronic document is distributed to the recipient in accordance with the priority category value.

FIG. 9 shows an illustrative user interface window 902 that displays an option that enables a sender to assign a priority category value to an electronic document such that the electronic document is distributed to the recipient in accordance with the priority category value. In the example shown in FIG. 9, the electronic document may be an email. The user interface window 902 may be displayed by an email application on a sender device, such as the email application 112. In this example, the sender may activate a recipient customization control 904 for a highlighted section 906. Subsequently, the sender may select a "private" setting of the recipient customization control 904. Accordingly, once the sender has selected the "private" setting, the email application may instantiate a recipient selection control 908. The recipient selection control 908 may enable the sender to select one or more specific recipients that are to receive the section 906. For example, the recipient of the section 906 in this scenario is "Sarah." However, the recipient selection control 908 may include an action control option 910.

Upon the activation of the action control option 910, the email application may instantiate an action selection menu 912. The action selection menu 912 may include an assign category option 914. The activation of the assign category option 914 may cause the email application to instantiate a category assignment menu 916. The category assignment menu 916 may be used by the sender to assign a category priority value to the section 906. For instances, the category priority values may be on a scale of 1-5, in which "1" signals the highest priority, and "5" signals the lowest priority. The assigned category priority value to the section 906 may determine which of multiple inbox categories the email may be placed. For example, an email inbox provided by a recipient email application may include multiple category folders, and the recipient email application may automatically place the email in a corresponding category folder based on the assigned category priority value. In this way, the recipient may have the choice of prioritizing the viewing of emails in some categories over other categories based on the assigned priority.

Alternatively or concurrently, the assigned category priority value may determine the corresponding priority indicator that is provided to the email by the recipient email application. Priority indicators for emails may take the form of different color markings, different shading, different legends, different size fonts or text emphases, and/or another indication. In some instances, there may be a special priority value (e.g., zero), that causes the recipient email application to always keep the one or more corresponding emails that are assigned such a priority value at the top of a list of emails in an email inbox. Although FIG. 9 illustrates that assignment of a category priority value to a content section of an email, category priority values may also be assigned to emails in their entireties in alternative embodiments. Further, category priority values may also be assigned to task requests that are embedded in some emails in a similar manner.

In various embodiments, a "private" setting that is set for an individual recipient of an electronic document may override a conflicting "general" setting that is set for the entire electronic document. For example, the sender may use the category assignment menu 916 to assign a category priority value of "1" to the section 906 of the electronic document that is to be received by "Sarah". Such an assignment of category priority value will override any category priority value that is assigned to the entire electronic document as a whole. Thus, assuming that the category priority value assigned to a general version of the entire electronic document is "2", the private version of the electronic document received by "Sarah" that includes the section 906 will still have the category priority value of "1". However, other recipients will receive a general version of the electronic document that excludes section 906, in which the general version has a category priority value of "2".

Figure 10:
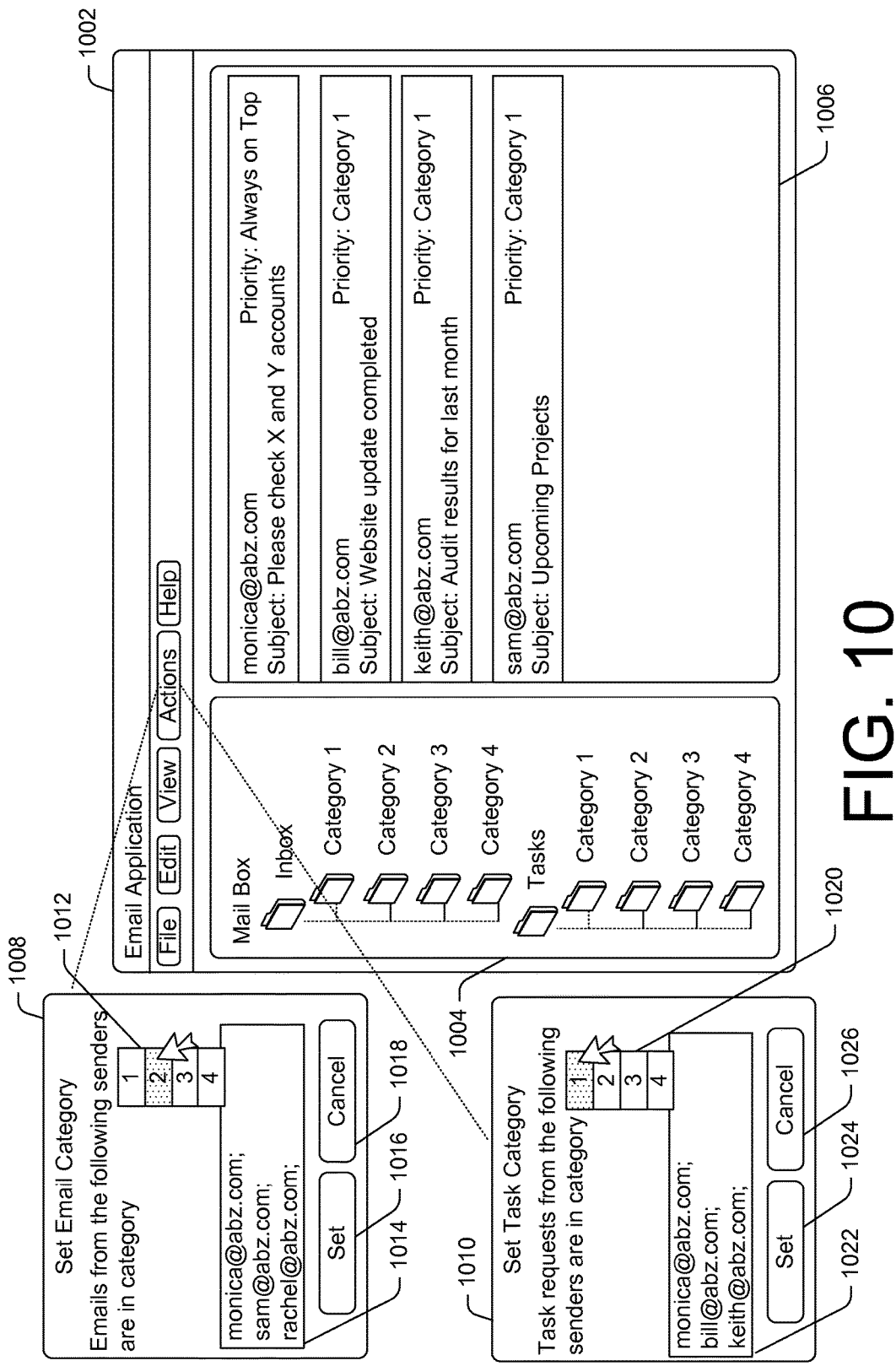
FIG. 10 shows an illustrative user interface window that enables a user of an email application to customize the display of received electronic documents in accordance with sender information.

FIG. 10 shows an illustrative user interface window that enables a user of an email application to customize the display of received electronic documents in accordance with sender information. In the example shown in FIG. 10, the electronic document may be an email. The user interface window 1002 may be displayed by an email application on a recipient device, such as the email application 118(1). The user interface window 1002 may include a folder pane 1004 and a preview pane 1006. The folder pane 1004 may display the different folders for storing emails with different category priority values. The preview pane 1006 may show emails that are in a particular folder when the folder is selected. For example, when the email folder with a category priority value of "1" is selected, the preview pane 1006 may show the emails that are in the folder. However, in some instances, emails that are marked as "keep on top", such as the email 114, may be shown at the top regardless of the category that is selected.

Alternatively or concurrently, the folder pane 1004 may also display the different folders for storing tasks with different category priority values. The preview pane 1006 may show tasks that are in a particular folder when the folder is selected. For example, when the task folder with a category priority value of "1" is selected, the preview pane 1006 may show the tasks that are in the folder. However, in some instances, tasks that are marked as "keep on top" may be shown at the top of the preview pane 1006 regardless of the category that is selected.

User control of the user interface window 1002 may include a set email category control 1008 and/or a set task category control 1010. These controls may enable the recipient to set category priority values for incoming emails and/or tasks. In some instances, the category priority values set by the recipient may override the category priority values that are set by the sender. For example, the set email category control 1008 may include a drop down list 1012 that enables the recipient to select a particular priority value, and an input field 1014 that enables the recipient to input the email addresses of email senders whose emails will be assigned the particular priority value. Alternatively, the recipient may select email addresses from a list that is populated by the email application from an email address book. The recipient may repeat such a process for one or more of the multiple priority values. The recipient may activate the set option 1016 once the priority value configuration is complete. The cancel option 1018 may be used by the recipient to cancel the priority value configuration.

In another example, the set task category control 1010 may include a drop down list 1020 that enables the recipient to select a particular priority value, and an input field 1022 that enables the recipient to input the email addresses of email senders whose task requests will be assigned the particular priority value. Alternatively, the recipient may select email addresses from a list that is populated by the email application from an email address book. The recipient may repeat such a process for one or more of the multiple priority values. The recipient may activate the set option 1024 once the priority value configuration is complete. The cancel option 1026 may be used by the recipient to cancel the priority value configuration.

It will be appreciated that FIGS. 3-10 show customizations that are performed using user interface windows that enables a user to select customization configurations, customizations may be also be performed using customization tags in other embodiments. In such embodiments, a user may customization tags into an electronic document. For example, the tags may include symbols or strings of symbols that have predetermined meaning to a distribution application (e.g., the mail application 112) when placed in specific positions relative to the content of the electronic document. For example, the tag "<private:sarah@abz.com>" place at the beginning and end of a content section may indicate that the content section is a private section that is for exclusive viewing by a particular recipient. The distribution application may store the customization tags for an electronic document as metadata associated with the electronic document. Furthermore, while the customizations shown in FIGS. 3-10 are described as being performed with respect to emails, the customizations may be applicable to other electronic documents, such as to word processing documents, spreadsheets, slide-based presentations, and/or another indication.

Illustrative Operations

FIGS. 11-15 show illustrative processes 1100-1500 that implement customized electronic document distribution. Each of the processes 1100-1500 is illustrated as a collection of steps in a logical flow diagram, which represents a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 1100-1500 are described with reference to the architecture 100 of FIG. 1.

Figure 11:
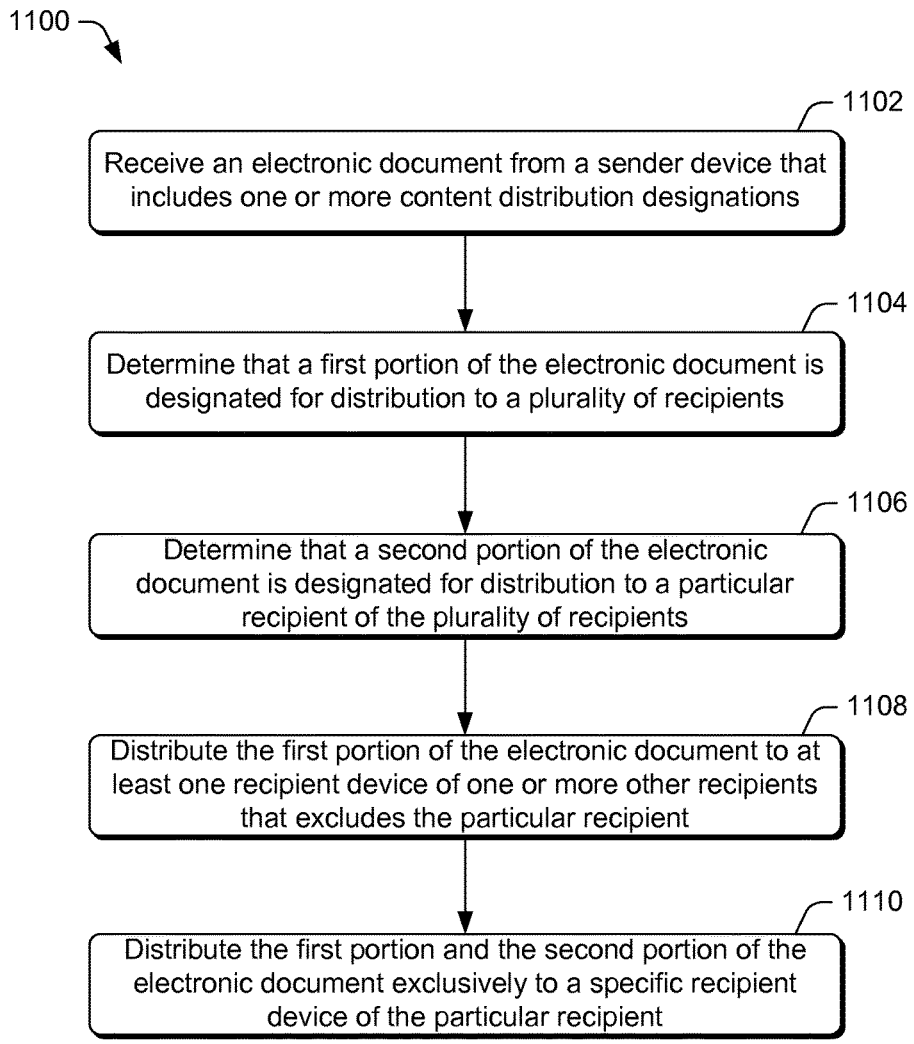
FIG. 11 is a flow diagram of an illustrative process for distributing portions of an electronic document according to content distribution designations as general portions or private portions.

FIG. 11 is a flow diagram of an illustrative process 1100 for distributing portions of an electronic document according to content distribution designations as general portions or private portions. At block 1102, the distribution host 202 may receive an electronic document from a sender device, such as the sender device 110, which includes one or more content distribution designations. In various embodiments, the electronic document may be an email, a word processing document, a spreadsheet, a slide-based presentation, and/or another indication. The electronic document may be created or modified by a sender at the sender device.

At block 1104, the distribution host 202 may determine that a first portion of the electronic document is designated for distribution to a plurality of recipients. The designation may be accomplished at the sender device via an application, such as the email application 112. The distribution host 202 may make the determination based on metadata that is associated with the electronic document. For example, the metadata may be embedded or otherwise sent along with the electronic document to the distribution host 202.

At block 1106, the distribution host 202 may determine that a second portion of the electronic document is designated for distribution to a particular recipient of the plurality of recipients. In various embodiments, the second portion may include content that is for the exclusive viewing of the particular recipient. For example, the particular recipient may have more responsibility or skills than the other recipients of the plurality of recipients.

At block 1108, the distribution host 202 may distribute the first portion of the electronic document to at least one recipient device of one or more recipients that excludes the particular recipient. For example, the one or more recipients may include at least one of the recipients 106(1)-106(N), and the multiple recipient devices may include at least one of the recipient devices 116(1)-116(N). The distribution host 202 may distribute the electronic documents to the one or more applications on the recipient devices, such as one or more of the email applications 118(1)-118(N).

At block 1110, the distribution host 202 may distribute the first portion and the second portion of the electronic document exclusively to a specific recipient device of the particular recipient. In other words, the first and second portions of the electronic document are delivered to the specific recipient device as a single document.

Figure 12:
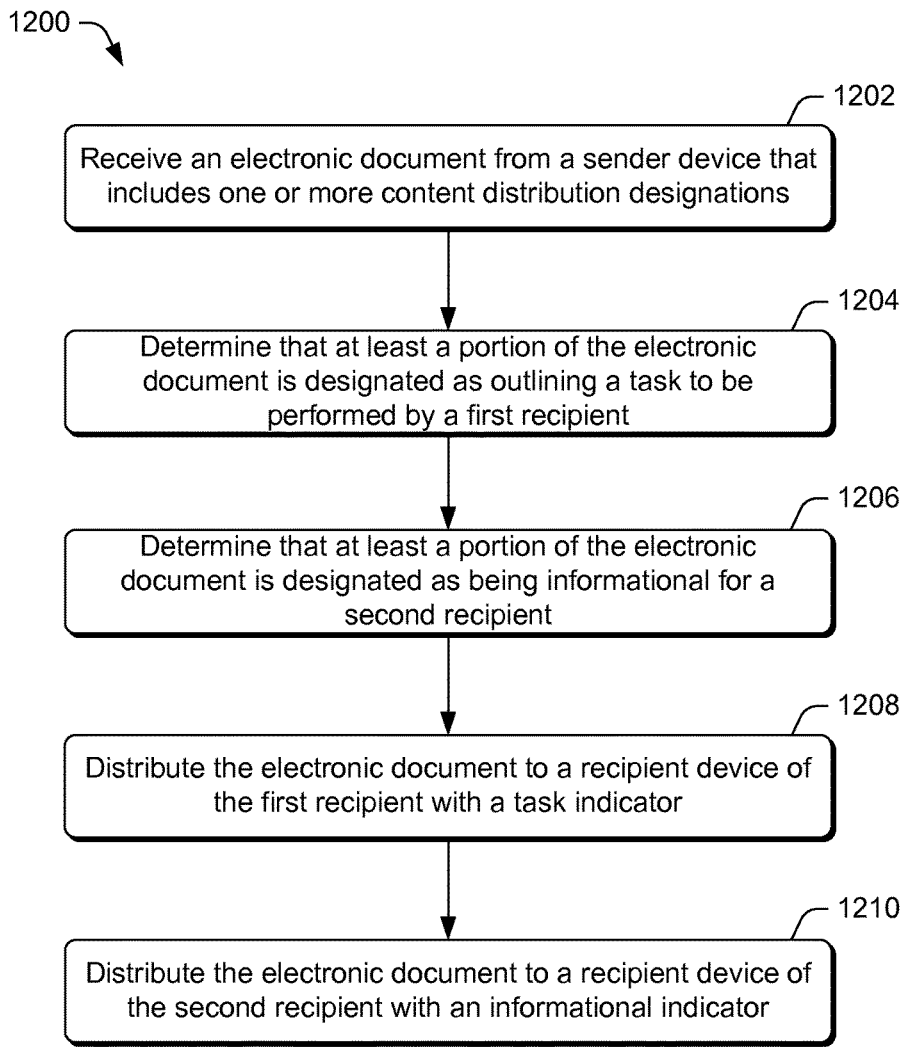
FIG. 12 is a flow diagram of an illustrative process for distributing portions of an electronic document to multiple recipients as an informational portion and a task portion according to content distribution designations.

FIG. 12 is a flow diagram of an illustrative process 1200 for distributing portions of an electronic document to multiple recipients as an informational portion and a task portion according to content distribution designations. At block 1202, the distribution host 202 may receive an electronic document from a sender device, such as the sender device 110, which includes one or more content distribution designations. In various embodiments, the electronic document may be an email, a word processing document, a spreadsheet, a slide-based presentation, and/or another indication. The electronic document may be created or modified by a sender at the sender device.

At block 1204, the distribution host 202 may determine that at least a portion of the electronic document is designated as outlining a task to be performed by a first recipient. The designation may be accomplished at the sender device via an application, such as the email application 112. The distribution host 202 may make the determination based on metadata that is associated with the electronic document. For example, the metadata may be embedded or otherwise sent along with the electronic document to the distribution host 202. In some embodiments, the electronic document may include a task request or an appointment request.

At block 1206, the distribution host 202 may determine that at least a portion of the electronic document is designated as being informational for a second recipient. Once again, the designation may be accomplished at the sender device via an application, such as the email application 112. The distribution host 202 may make the determination based on metadata that is associated with the electronic document.

At block 1208, the distribution host 202 may distribute the electronic document to a recipient device of the first recipient with a task indicator. In some embodiments, the task indicator may be distributed along with a task request or an appointment request that is to be added to a project management application or calendar application used by the first recipient.

At block 1210, the distribution host 202 may distribute the electronic document to a recipient device of the second recipient with an informational indicator. The informational indicator may enable the second recipient to understand that the electronic document contains information that is for the benefit of the second recipient rather than containing tasks to be performed.

Figure 13:
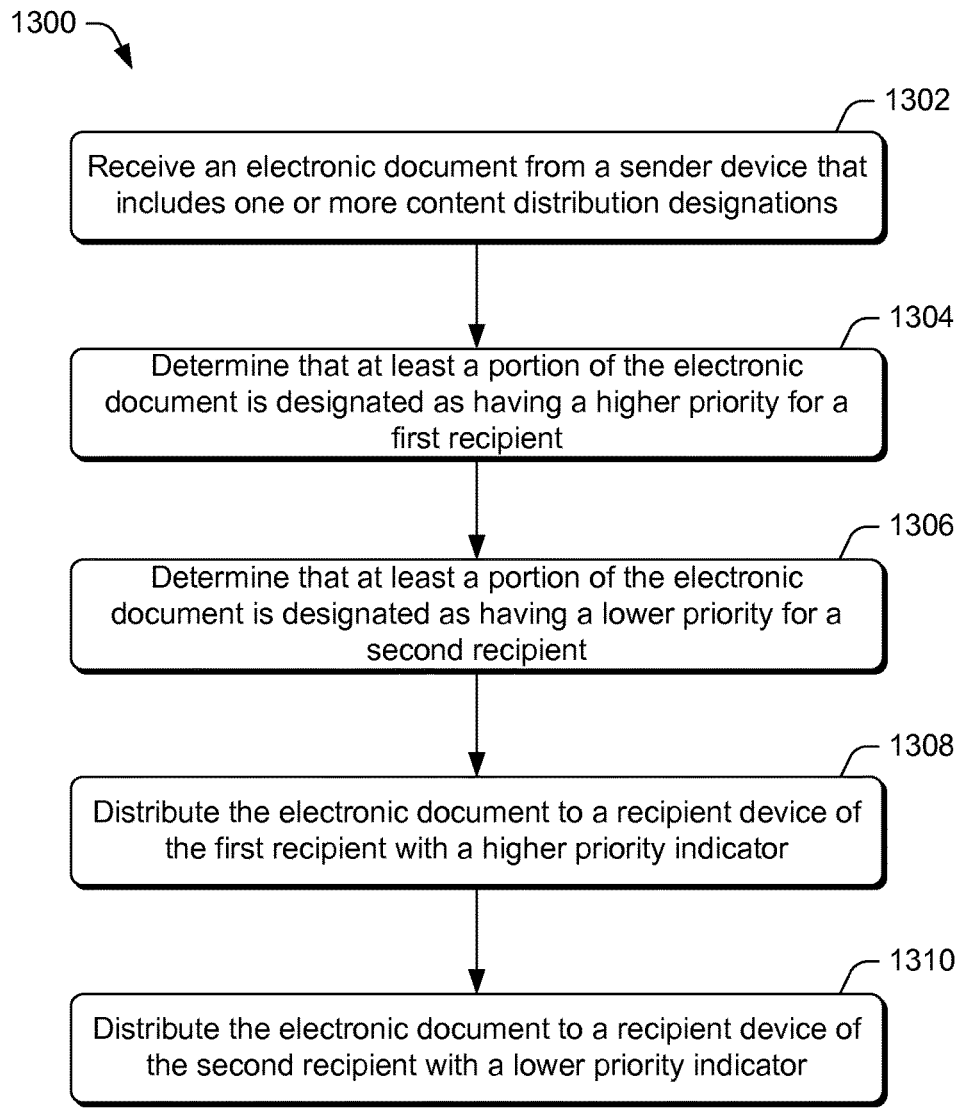
FIG. 13 is a flow diagram of an illustrative process for distributing an electronic document to multiple recipients using content distribution designations in the form of different priority values.

FIG. 13 is a flow diagram of an illustrative process 1300 for distributing an electronic document to multiple recipients using content distribution designations in the form of different priority values. At block 1302, the distribution host 202 may receive an electronic document from a sender device, such as the sender device 110, which includes one or more content distribution designations. In various embodiments, the electronic document may be an email, a word processing document, a spreadsheet, a slide-based presentation, and/or another indication. The electronic document may be created or modified by a sender at the sender device.

At block 1304, the distribution host 202 may determine that at least a portion of the electronic document is designated as having a higher priority for a first recipient. The designation may be accomplished at the sender device via an application, such as the email application 112. The distribution host 202 may make the determination based on metadata that is associated with the electronic document. For example, the metadata may be embedded or otherwise sent along with the electronic document to the distribution host 202.

At block 1306, the distribution host 202 may determine that at least a portion of the electronic document is designated as having a lower priority for a second recipient. Once again, the designation may be accomplished at the sender device via an application, such as the email application 112. The distribution host 202 may make the determination based on metadata that is associated with the electronic document.

At block 1308, the distribution host 202 may distribute the electronic document to a recipient device of the first recipient with a higher priority indicator. In various embodiments, the distribution may be accomplished by providing metadata that causes the recipient device of the first recipient to display the higher priority indicator. The higher priority indicator may be displayed by a recipient application (e.g., email application 118(1)) on the recipient device of the first recipient as a corresponding color marking, corresponding shading, a corresponding legend, a corresponding font size or text emphasis, and/or another indication. Alternatively, a recipient application may place the electronic document into a category that corresponds to the lower priority indicator.

At block 1310, the distribution host 202 may distribute the electronic document to a recipient device of the second recipient with a lower priority indicator. In various embodiments, the distribution may be accomplished by providing metadata that causes the recipient device of the second recipient to display the lower priority indicator. The lower priority indicator may be displayed by a recipient application (e.g., email application 118(1)) on the recipient device of the second recipient as a corresponding color marking, corresponding shading, a corresponding legend, a corresponding font size or text emphasis, and/or another indication. Alternatively, a recipient application may place the electronic document into a category that corresponds to the lower priority indicator.

Figure 14:
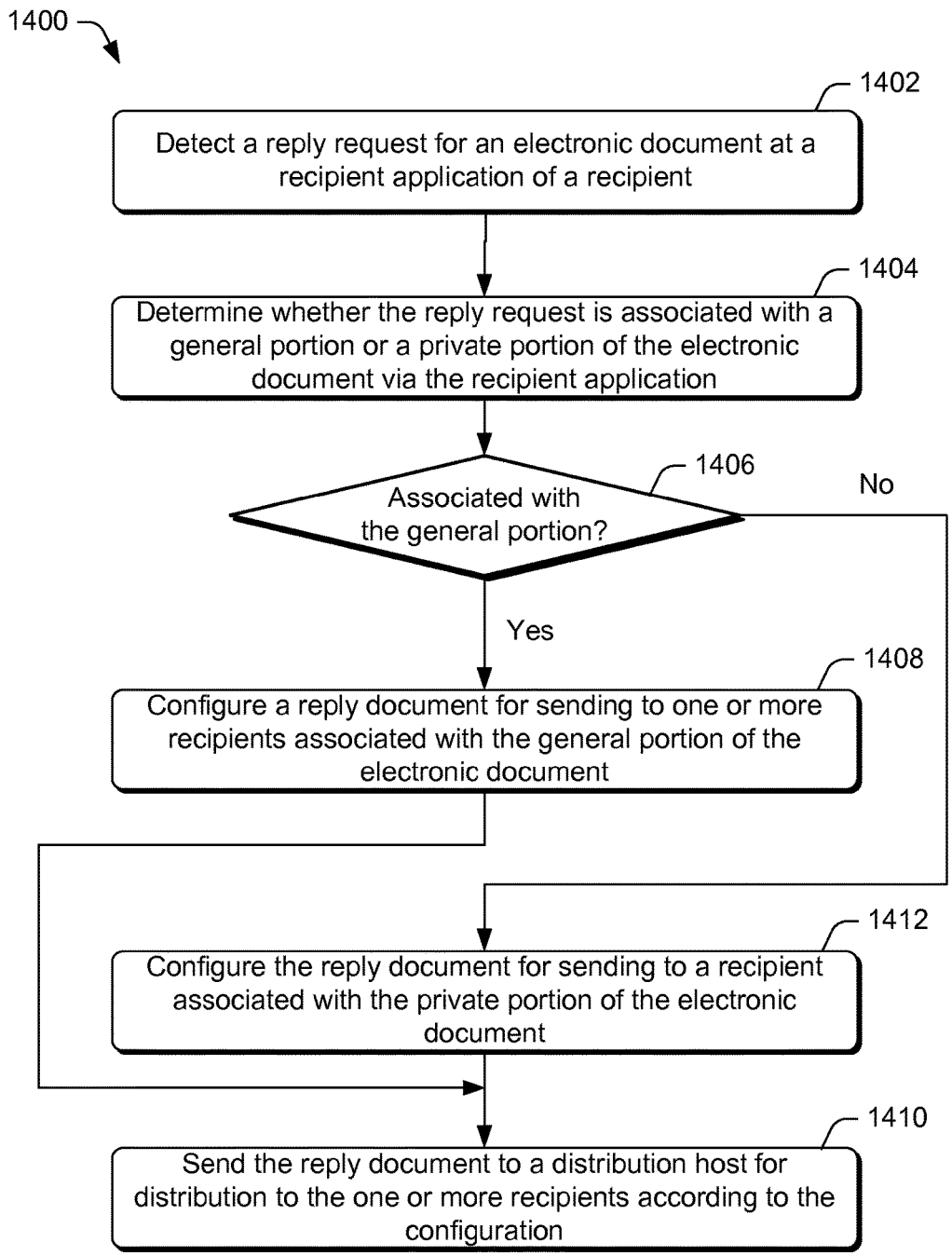
FIG. 14 is a flow diagram of an illustrative process for customizing different reply recipients for an electronic document based on the portion of the electronic document selected by a user.

FIG. 14 is a flow diagram of an illustrative process 1400 for customizing different reply recipients for an electronic document based on the portion of the electronic document selected by a user. At block 1402, a recipient application at a recipient device may detect a reply request for an electronic document. For example, the recipient application may be the email application 118(1) that is on the recipient device 116(1). The reply request may seek to return information to a sender that originally sent the electronic document to the recipient. In at least one instance, the return information may be a modified version of the electronic document. In various embodiments, the electronic document may be an email, a word processing document, a spreadsheet, a slide-based presentation, and/or another indication.

At block 1404, the recipient application may determine whether the reply request is associated with a general portion or a private portion of the electronic document. In various embodiments, the determination may be made based on which portion of the electronic document is highlighted or which portion a pointer device is located at the time the reply request is made. At decision block 1406, if the recipient application determines that the reply request is associated with the general portion ("yes" at decision block 1406), the process 1400 may proceed to block 1408.

At block 1408, the recipient application may configure the reply document for sending to one or more recipients that are associated with the general portion of the electronic document. For example, the one or more recipients may include the sender of the electronic document and at least one other recipient of the general portion. In some embodiments, the reply document may be a reply email or a document that is attached to the reply email. At block 1410, the recipient application may send the reply document a distribution host (e.g., the distribution host 202) for distribution to the one or more recipients according to the configuration.

However, if the recipient application determines that the reply request is not associated with the general portion ("no" at decision block 1406); the recipient application may determine that the reply request is associated with the private portion. Accordingly, the process 1400 may proceed to block 1412.

At block 1412, the recipient application may configure the reply document for sending to a recipient that is associated with the private portion of the electronic document. For example, the recipient may be the sender of the electronic document. In some embodiments, the reply document may be a reply email or a document that is attached to the reply email.

Figure 15:
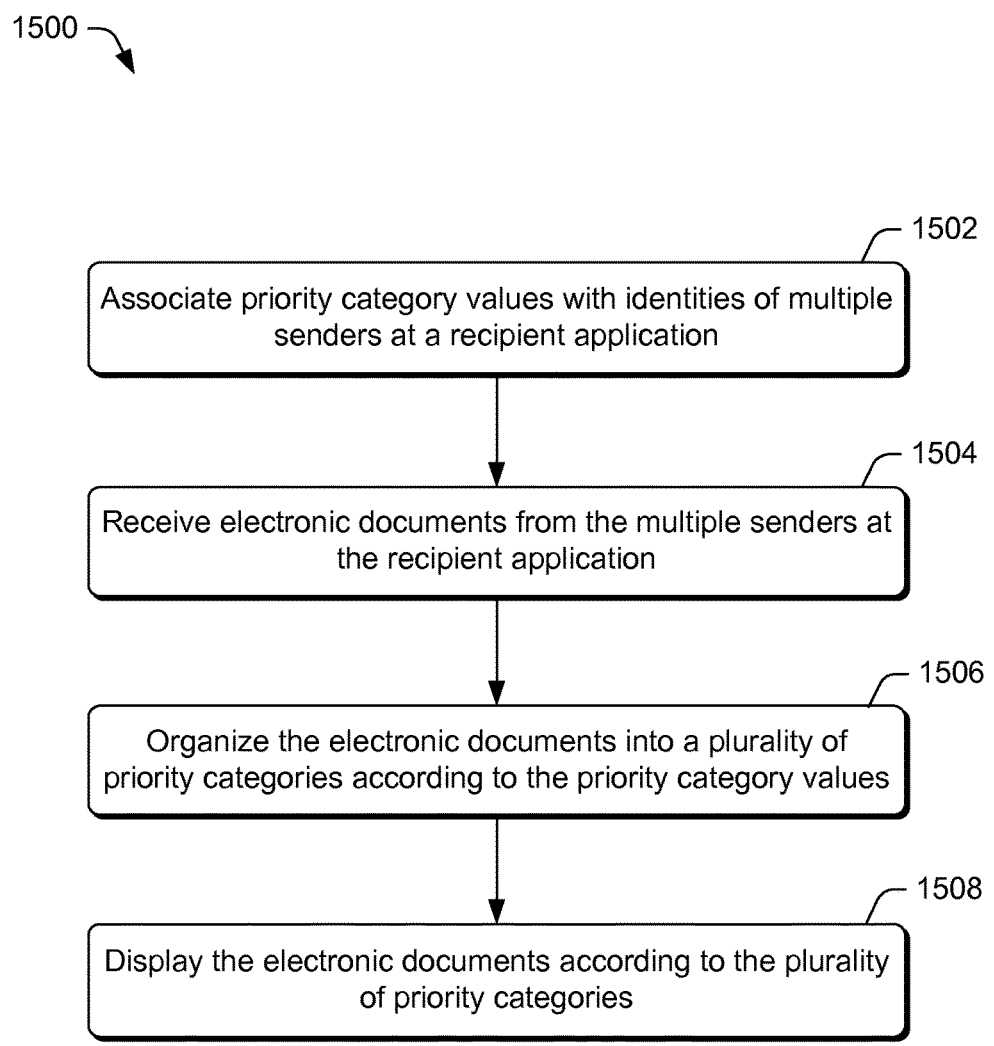
FIG. 15 is a flow diagram of an illustrative process for customizing the display of received electronic documents in accordance with sender information.

FIG. 15 is a flow diagram of an illustrative process 1500 for customizing the display of received electronic documents in accordance with sender information. At block 1502, a recipient may use a recipient application (e.g., the email application 118(1)) to associate priority category values with identities of multiple senders at a recipient device, such as the recipient device 116(1). In some embodiments, the identities of the senders may be in the form of email addresses or email aliases of the senders. Each priority category value may indicate the importance of a corresponding sender to the recipient.

At block 1504, the recipient application may receive electronic documents from the multiple senders at the recipient application. Each of the electronic documents may be an email, a word processing document, a spreadsheet, a slide-based presentation, and/or another indication. Each of the electronic documents may be created or modified by a sender at the sender device. In various embodiments, the distribution host 202 may provide the electronic documents to the recipient application.

At block 1506, the recipient application may organize the electronic documents into a plurality of priority categories according to the priority category values that are associated with the multiple senders. For example, if a sender is associated with a priority category value of "1", then the electronic document that is received from the sender will be assigned the priority category value of "1" and organized accordingly. In some embodiments, the organization may include placing the electronic documents into folders according to their assigned priority category values. Alternatively or concurrently, the organization may also include providing each electronic document with corresponding color marking, corresponding shading, a corresponding legend, a corresponding font size or text emphasis, and/or another indication.

At block 1508, the recipient application may display the electronic documents according to the plurality of priority categories. For example, when a recipient selects a particular priority category, the recipient application may display one or more electronic documents that are placed in the particular priority category. The display may also alternatively or concurrently include display the electronic documents with corresponding color markings, corresponding shadings, corresponding legends, corresponding font sizes or text emphases, and/or another indication.

In summary, by customizing the distribution of the portions of an electronic document and assigning different action indications or priority indications to the electronic document for different recipients, the electronic documents may be processed in a more efficient manner by the recipients of the electronic documents. For example, in instances in which the electronic documents are emails, problems such as the inadvertent generation of multiple email threads, being overwhelmed by irrelevant emails, as well as inaction due to unclear delegation of tasks described in the emails may be reduced or prevented.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer readable media storing computer-executable instructions that, when executed, cause one or more processors to perform acts comprising:

analyzing an email received from a sender device that includes one or more content distribution designations;

determining that a first portion of the email is designated for distribution to a first recipient and a second recipient;

determining that a second portion of the email is designated for distribution to the second recipient and not the first recipient;

determining that the first portion of the email is assigned a first priority category value designated for the first recipient;

determining that the second portion of the email is assigned a second priority category value designated for the second recipient;

distributing the first portion of the email as a first version of the email to a first recipient device of the first recipient, the first recipient device including a first recipient application that is configured to provide a first visual indication that the first version of the email is placed within a first inbox priority folder designated with the first priority category value; and distributing the first portion and the second portion of the email as a second version of the email exclusively to a second recipient device of the second recipient, the second recipient device including a second recipient application that is configured to provide a second visual indication that the second version of the email is placed within a second inbox priority folder designated with the second priority category value.

2. The one or more non-transitory computer readable media of claim 1, wherein the acts further comprise determining, based at least in part on the one or more content distribution designations, that the second portion of the email includes an embedded task event configured to update a project management application or a calendar application on the second recipient device of the second recipient, wherein the embedded task event includes a scheduled date and a scheduled time for a completion of a task or an appointment date and time related to the task.

3. The one or more non-transitory computer readable media of claim 1, wherein the first visual indication or the second visual indication includes at least one of (i) placing the first version of the email in the first inbox priority folder that correlates with the first priority category value or the second version of the email in the second inbox priority folder that correlates with the second priority category value, or (ii) marking the first version of the email with a first visual priority indicator that correlates with the first priority category value and is indicative of the first version of the email having the first priority category value or the second version of the email with a second visual priority indicator that correlates with the second priority category value and is indicative of the second version of the email having the second priority value.

4. The one or more non-transitory computer readable media of claim 1, wherein the acts further comprise receiving a reply electronic document from the second recipient device of the second recipient, the reply electronic document being addressed:
   to a sender associated with the sender device and the first recipient through a first reply request that is initiated in relation to the first portion of the second version of the email; or
   to the sender and not to the first recipient through a second reply request that is initiated in relation to the second portion of the second version of the email.

5. A method comprising:
   receiving, by one or more computing devices, an electronic document from a sender device that includes one or more content distribution designations;
   determining, by the one or more computing devices, that a first portion of the electronic document is designated for distribution to a first recipient and a second recipient;
   determining, by the one or more computing devices, that a second portion of the electronic document is designated for distribution to the second recipient and not the first recipient;
   determining that the first portion of the electronic document is assigned a first priority category value designated for the first recipient;
   determining that the second portion of the electronic document is assigned a second priority category value designated for the second recipient;
   distributing, by the one or more computing devices, a first version of the electronic document to a first recipient device of the first recipient, the first version of the electronic document including the first portion of the electronic document and a first visual indication that the first version of the electronic document is placed within a first inbox priority folder designated with the first priority category value; and
   distributing, by the one or more computing devices, a second version of the electronic document to a second recipient device of the second recipient, the second version of the electronic document including the first portion and the second portion of the electronic document and a second visual indication that the second version of the electronic document is placed within a second inbox priority folder designated with the second priority category value.

6. The method of claim 5, further comprising receiving a reply electronic document from the second recipient device of the second recipient, the reply electronic document being addressed:
   to a sender associated with the sender device and the first recipient in response to the reply electronic document being initiated in relation to the first portion of the second version of the electronic document; or
   to the sender and not to the first recipient in response to the reply electronic document being initiated in relation to the second portion of the second version of the electronic document.

7. The method of claim 5, further comprising determining, based at least in part on the one or more content distribution designations, that the second portion of the electronic document includes an embedded task event configured to update a project management application or a calendar application on the second recipient device of the second recipient.

8. The method of claim 7, wherein the embedded task event includes a scheduled date and a scheduled time for a completion of a task or an appointment date and time related to the task.

9. The method of claim 7, wherein the second portion of the electronic document in the second version of the electronic document includes a visual indicator that corresponds to the embedded task event.

10. The method of claim 5, wherein the first visual indication or the second visual indication causes a first recipient application or a second recipient application to at least one of (i) place the first version of the electronic document in the first inbox priority folder that correlates with the first priority category value or the second version of the electronic document in the second inbox priority folder that correlates with the second priority category value, or (ii) mark the first version of the electronic document with a first visual priority indicator that is associated with the first priority category value or the second version of the electronic document with a second visual priority indicator that is associated with the second priority category value.

11. The method of claim 5, wherein the first visual indication or the second visual indication causes a first recipient application or a second recipient application to display the first version of the electronic document or the second version of the electronic document in a hierarchy with respect to one or more additional electronic documents on the first recipient device or the second recipient device based at least in part on the first priority category value or the second priority category value.

12. The method of claim 5, wherein the first recipient is designated to receive the first portion of the electronic document and the second recipient is designated to receive the first portion of the electronic document and the second portion of the electronic document via a global rule established via a sender application at the sender device.

13. The method of claim 5, wherein the electronic document is at least one of an email, a word processing document, a spreadsheet, or a slide-based presentation.

14. The method of claim 5, wherein the one or more content distribution designations include at least one of tags that are inputted into the electronic document or configurations that are selected for the electronic document via one or more user interface menus.

15. A device, comprising:
one or more processors; and
memory storing components that are executable by the one or more processors to perform actions comprising:
receiving, by a recipient application executing on the device, a first user input selection of a first priority category value and a first identity of a first sender;
assigning, based on the first user input selection received by the recipient application, the first priority category value to the first identity of the first sender;
receiving, by the recipient application, a second user input selection of a second priority category value and a second identity of a second sender;
assigning, based on the second user input selection received by the recipient application, the second priority category value to the second identity of the second sender;
receiving, by the recipient application, a first electronic document from the first sender and a second electronic document from the second sender;
associating the first electronic document with a first priority category based at least in part on the first priority category value;
associating the second electronic document with a second priority category based at least in part on the second priority category value; and
causing the recipient application to display the first electronic document and the second electronic document according to the first priority category and the second priority category by visually indicating, via the recipient application, that the first electronic document is placed within a first inbox priority folder associated with the first priority category and that the second electronic document is placed within a second inbox priority folder associated with the second priority category.

16. The device of claim 15, wherein visually indicating, via the recipient application, that the first electronic document is placed within the first inbox priority folder and that the second electronic document is placed within the second inbox priority folder includes (i) placing the first electronic document in the first inbox priority folder associated with the first priority category or the second electronic document in the second inbox priority folder associated with the second priority category, or (ii) marking the first electronic document with a first visual priority indicator that correlates with the first priority category or the second electronic document with a second visual priority indicator that correlates with the second priority category.

17. The device of claim 15, wherein visually indicating, via the recipient application, that the first electronic document is placed within the first inbox priority folder and that the second electronic document is placed within the second inbox priority folder includes placing the first electronic document at a top of a list of electronic documents based on the first priority category value or placing the second electronic document at the top of the list based on the second priority category value.

18. The device of claim 15, wherein the first electronic document or the second electronic document is at least one of an email for the recipient or a task event that updates a project management application or a calendar application executing on the device.

19. The device of claim 15, wherein the first electronic document includes a first portion and a second portion, the actions further comprising:
receiving, via the recipient application, a reply request in relation to the first portion of the first electronic document; and
generating a reply electronic document that:
is addressed to the first sender and at least one additional recipient that received a version of the first electronic document having the first portion but not the second portion, and
includes the first portion but not the second portion.

20. The method of claim 6, further comprising:
determining that the reply electronic document includes the first portion and not the second portion in response to the reply electronic document being initiated in relation to the first portion of the second version of the electronic document; or
determining that the reply electronic document includes the first portion and the second portion in response to the reply electronic document being initiated in relation to the second portion of the second version of the electronic document.

* * * * *